(12) United States Patent
Komatsu et al.

(10) Patent No.: US 11,397,792 B2
(45) Date of Patent: Jul. 26, 2022

(54) ANOMALY DETECTING DEVICE, ANOMALY DETECTING METHOD, AND RECORDING MEDIUM

(71) Applicant: NEC Corporation, Tokyo (JP)

(72) Inventors: Tatsuya Komatsu, Tokyo (JP); Reishi Kondo, Tokyo (JP)

(73) Assignee: NEC CORPORATION, Tokyo (JP)

( * ) Notice: Subject to any disclaimer, the term of this patent is extended or adjusted under 35 U.S.C. 154(b) by 728 days.

(21) Appl. No.: 16/329,794

(22) PCT Filed: Sep. 5, 2017

(86) PCT No.: PCT/JP2017/031894
§ 371 (c)(1),
(2) Date: Mar. 1, 2019

(87) PCT Pub. No.: WO2018/047804
PCT Pub. Date: Mar. 15, 2018

(65) Prior Publication Data
US 2019/0243872 A1 Aug. 8, 2019

(30) Foreign Application Priority Data
Sep. 8, 2016 (JP) .............................. JP2016-175402

(51) Int. Cl.
G06F 17/18 (2006.01)
G06N 7/00 (2006.01)
G05B 23/02 (2006.01)

(52) U.S. Cl.
CPC ............. *G06F 17/18* (2013.01); *G05B 23/02* (2013.01); *G06N 7/00* (2013.01)

(58) Field of Classification Search
None
See application file for complete search history.

(56) References Cited

U.S. PATENT DOCUMENTS 6,892,163 B1 * 5/2005 Herzog ................ G06K 9/6278
700/30

FOREIGN PATENT DOCUMENTS

| CN | 102163427 A | 8/2011 |
| JP | H08-094497 A | 4/1996 |

(Continued)

OTHER PUBLICATIONS

Harmouche, J. ("Statistical Incipient Fault Detection and Diagnosis with Kullback-Leibler Divergence: From Theory to Applications", 2014, Doctoral dissertation, Supélec) (Year: 2014).*

(Continued)

*Primary Examiner* — Roy Y Yi
(74) *Attorney, Agent, or Firm* — Sughrue Mion, PLLC

(57) ABSTRACT

An anomaly detecting device according to the present invention includes: a memory; and at least one processor coupled to the memory. The processor performs operations. The operations includes: when first series data are input, extracting a series feature amount being a feature amount of a signal included in the first series data; calculating a series probability distribution being a probability distribution which the series feature amount follows; storing a reference probability distribution being a probability distribution designated as a reference for the series feature amount in the first series data; calculating a state feature amount representing a fluctuation condition of the series probability distribution with respect to the reference probability distribution; and detecting an anomaly of the first series data, based on a plurality of the state feature amounts calculated from the first series data.

16 Claims, 16 Drawing Sheets

(56) References Cited

FOREIGN PATENT DOCUMENTS

| JP | H10-026648 A | 1/1998 |
|----|--------------|--------|
| JP | 2004-54370 A | 2/2004 |
| JP | 2006-331300 A | 12/2006 |
| JP | 2013-12872 A | 1/2013 |
| JP | 2015-64347 A | 4/2015 |
| WO | 2008/087968 A1 | 7/2008 |
| WO | 2013/105164 A1 | 7/2013 |

OTHER PUBLICATIONS

Japanese Office Action for JP Application No. 2013-538414 dated Jul. 27, 2021 with English Translation.

Ueda et al., "Detecting Latent Structural Changed via Latent Dirichlet Allocation", The Institute of Electronics, Information and Communication Engineers, IEICE Technical Report, Mar. 5, 2012, pp. 15-20 (total 6 pages).

International Search Report of PCT/JP2017/031894 dated Nov. 14, 2017 [PCT/ISA/210].

Written Opinion of PCT/JP2017/031894 dated Nov. 14, 2017 [PCT/ISA/237].

Japanese Office Action for JP Application No. 2018-538414 dated Oct. 19, 2021 with English Translation.

Aiba et al., "Decisions of threshold and mixture number for detection of abnormal sounds using multi-stage GMM", Japan Audio Society, document of the Japan Society of Acoustics, vol. 2010, Mar. 10, 2010, pp. 781 to 782.

Aiba et al., "Segment feature and SVM for detection of abnormal sounds using GMM", Japan Audio Society, Sep. 17, 2009, pp. 621 to 624.

Tanaka et al., "Abnormal sound detection system using normal sound sequential learning", Japan Audio Society, Mar. 11, 2011, pp. 833 to 834.

\* cited by examiner

ANOMALY DETECTING DEVICE, ANOMALY DETECTING METHOD, AND RECORDING MEDIUM

This application is a National Stage Entry of PCT/JP2017/031894 filed on Sep. 5, 2017, which claims priority from Japanese Patent Application 2016-175402 filed on Sep. 8, 2016, the contents of all of which are incorporated herein by reference, in their entirety.

TECHNICAL FIELD

The present invention relates to an anomaly detecting device, an anomaly detecting method, and a recording medium which detect an anomaly from series data.

BACKGROUND ART

In the technical field described above, patent literature (PTL) 1, for example, describes the following method. The method is a method which represents, by a probability distribution, a probability that sequentially-input series data are generated, thereby models a state of a generation mechanism of series data at generation, and then detects a statistical outlier emerging in series data and a change point in a state of a generation mechanism.

Moreover, PTL 2 describes a method of detecting an anomaly of an observation target by threshold-processing a dissimilarity indicating a degree of difference between a statistical amount of a probability density function of each variable of sequentially-input series data and a statistical amount of a probability density function of a predetermined reference.

CITATION LIST

Patent Literature

[PTL 1] Japanese Unexamined Patent Application Publication No. 2004-054370
[PTL 2] Japanese Unexamined Patent Application Publication No. 2006-331300

SUMMARY OF INVENTION

Technical Problem

However, in real issues, a change in a state of a generation mechanism is not always an anomaly targeted for detection. For example, it is assumed that, from series data acquired by using such a generation mechanism as to operate while a state thereof constantly changes during a normal operation, an anomaly of the state of the generation mechanism is detected. In such a case, the method described in PTL 1 has an issue that an anomaly truly needed to detect cannot be accurately detected, because a change in an operating state in a normal state is also sensed as an outlier of series data or a change point in a state.

Moreover, the method which simply threshold-processes a dissimilarity as described in PTL 2 also has an issue similar to that described above. In other words, with only simple threshold-processing of a dissimilarity, since a change in an operating state in a normal state is also sensed as an outlier of series data or a change point in a state, it is not possible to accurately detect an anomaly truly needed to detect.

In view of the problem described above, an object of the present technique is to enable an anomaly to be accurately detected even from series data resulting from a generation mechanism involving a change in a state.

Solution to Problem

An anomaly detecting device according to one aspect of the present invention includes:
a memory; and
at least one processor coupled to the memory,
the processor performing operations, the operations includes:
when first series data are input, extracting a series feature amount being a feature amount of a signal included in the first series data;
calculating a series probability distribution being a probability distribution which the series feature amount follows;
storing a reference probability distribution being a probability distribution designated as a reference for the series feature amount in the first series data;
calculating a state feature amount representing a fluctuation condition of the series probability distribution with respect to the reference probability distribution; and
detecting an anomaly of the first series data, based on a plurality of the state feature amounts calculated from the first series data.

An anomaly detecting method according one aspect of the present invention includes:
when first series data are input, extracting a series feature amount being a feature amount of a signal included in the first series data;
calculating a series probability distribution being a probability distribution which the series feature amount follows;
calculating a state feature amount representing a fluctuation condition of the series probability distribution with respect to a reference probability distribution being a probability distribution designated as a reference for the series feature amount in the first series data; and
detecting an anomaly of the first series data, based on a plurality of the state feature amounts calculated from the first series data.

A non-transitory computer-readable recording medium according to one aspect of the present invention computer-readably records an anomaly detecting program. The anomaly detecting program causes a computer to perform a method. The method includes:
when first series data are input, extracting a series feature amount being a feature amount of a signal included in the first series data;
calculating a series probability distribution being a probability distribution which the series feature amount follows;
calculating a state feature amount representing a fluctuation condition of the series probability distribution with respect to a reference probability distribution being a probability distribution designated as a reference for the series feature amount in the first series data; and
detecting an anomaly of the first series data, based on a plurality of the state feature amounts calculated from the first series data.

Advantageous Effects of Invention

According to the present invention, it is possible to accurately detect an anomaly even from series data resulting from a generation mechanism involving a change in a state.

EXAMPLE EMBODIMENT

Figure 1:
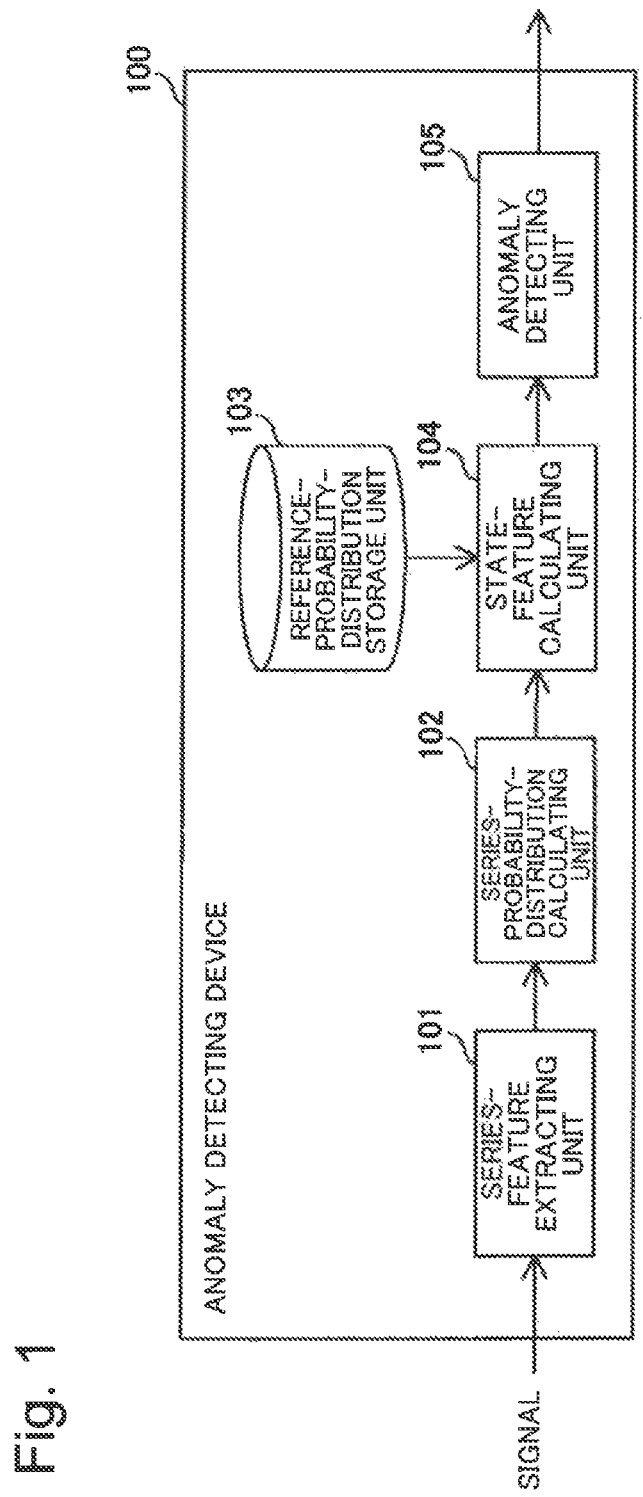
FIG. 1 is a block diagram illustrating a configuration example of an anomaly detecting device according to a first example embodiment.

Hereinafter, example embodiments of the present invention will be described with reference to the drawings.

A direction of an arrow in the drawing illustrates one example, and does not limit a direction of a signal between blocks.

Example Embodiment 1

An anomaly detecting device 100 according to a first example embodiment of the present invention is described with reference to the drawings. The anomaly detecting device 100 illustrated in FIG. 1 includes a series-feature extracting unit 101, a series-probability-distribution calculating unit 102, a reference-probability-distribution storage unit 103, a state-feature calculating unit 104, and an anomaly detecting unit 105.

The series-feature extracting unit 101 acquires series data (a signal in FIG. 1) as an input, and outputs a feature amount extracted from the series data. More specifically, the series-feature extracting unit 101 extracts a predetermined feature amount from input series data, and then outputs the feature amount. A feature amount extracted by the series-feature extracting unit 101 may be, for example, a predetermined feature amount of a signal at a time point of each time frame defined by a predetermined time unit. Hereinafter, there is a case where a feature amount extracted from series data is referred to as a series feature amount.

The series-probability-distribution calculating unit 102 acquires a series feature amount as an input, and calculates and outputs a series probability distribution being a probability distribution which the series feature amount follows. Herein, a series probability distribution needs only to be something representing as to what kind of series feature amount and with what kind of probability the series data output. In other words, a series probability distribution is related to under what state of a generation mechanism the series data serving as a basis of the series feature amount are generated.

The reference-probability-distribution storage unit 103 stores a reference probability distribution being a probability distribution serving as a reference for a series probability distribution. A series probability distribution is related to a state set as a reference by a user, in a state of a generation mechanism of input series data.

The state-feature calculating unit 104 acquires, as inputs, a series probability distribution calculated by the series-probability-distribution calculating unit 102, and a reference probability distribution stored in the reference-probability-distribution storage unit 103, and outputs a state feature amount. More specifically, the state-feature calculating unit 104 calculates a state feature amount representing a fluctuation condition of a series probability distribution viewed from an input reference probability distribution, and then outputs the state feature amount. In the present example embodiment, the state-feature calculating unit 104 calculates a plurality of state feature amounts. The state-feature calculating unit 104 may calculate, for example, a state feature amount for each signal included in series data, as a second feature amount of a signal for which a series feature amount is calculated. Moreover, for example, the state-feature calculating unit 104 may output a calculated state feature amount, in relation to a time index of a signal included in series data.

The anomaly detecting unit 105 acquires, as inputs, a plurality of state feature amounts output from the state-feature calculating unit 104, and outputs presence or absence of an anomaly of series data. More specifically, the anomaly detecting unit 105 senses presence or absence of an anomaly in a state of a generation mechanism of input series data, based on a plurality of input state feature amounts, and then outputs presence or absence of an anomaly.

For example, the anomaly detecting unit 105 may designate, as second series data, data in which a state feature amount, calculated from series data, for respective time frames defined by a predetermined time unit are arranged in a time-series form, statistically process the second series data, and then sense presence or absence of an anomaly. The anomaly detecting unit 105 may calculate a probability distribution of a state feature amount, as a model of a state feature amount in series data, for example, based on two or more state feature amounts, and sense presence or absence of an anomaly by using the calculated probability distribution of the state feature amount.

Figure 2:
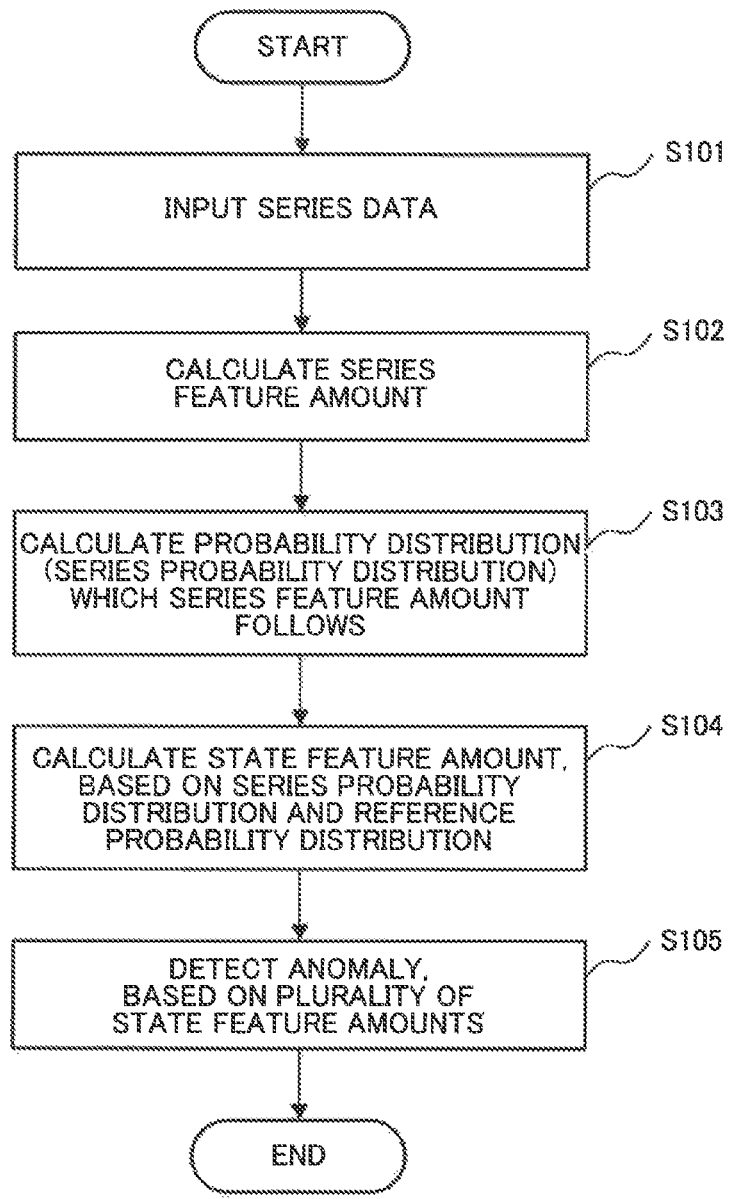
FIG. 2 is a flowchart illustrating one example of an operation of the anomaly detecting device according to the first example embodiment.

Next, an operation in the present example embodiment is described. FIG. 2 is a flowchart illustrating one example of an operation of the anomaly detecting device 100 according to the present example embodiment.

In the example illustrated in FIG. 2, first, series data are input to the anomaly detecting device 100 (step S101). Next, the series-feature extracting unit 101 calculates a series feature amount from the input series data (step S102).

Next, the series-probability-distribution calculating unit 102 calculates a series probability distribution, based on the calculated series feature amount (step S103).

Next, the state-feature calculating unit 104 calculates a state feature amount, based on the calculated series probability distribution, and a reference probability distribution stored in the reference probability distribution storage unit 103 (step S104).

Finally, the anomaly detecting unit 105 detects an anomaly of the series data, based on the two or more state feature amounts calculated from the series data (step S105).

As described above, based on the present example embodiment, an anomaly is detected by using a plurality of state feature amounts representing fluctuation conditions of states of a generation mechanism of input series data with respect to a reference state, and therefore, it is possible to statistically treat the fluctuation conditions of the generation mechanism which changes from moment to moment. In other words, in the present example embodiment, an anomaly is detected by using two or more state feature amounts, on a presumption that a state feature amount changes from moment to moment. Thus, even when a state of a generation mechanism of input series data changes, an anomaly, for example an anomalous outlier or change, can be appropriately detected from the series data.

Example Embodiment 2

Figure 3:
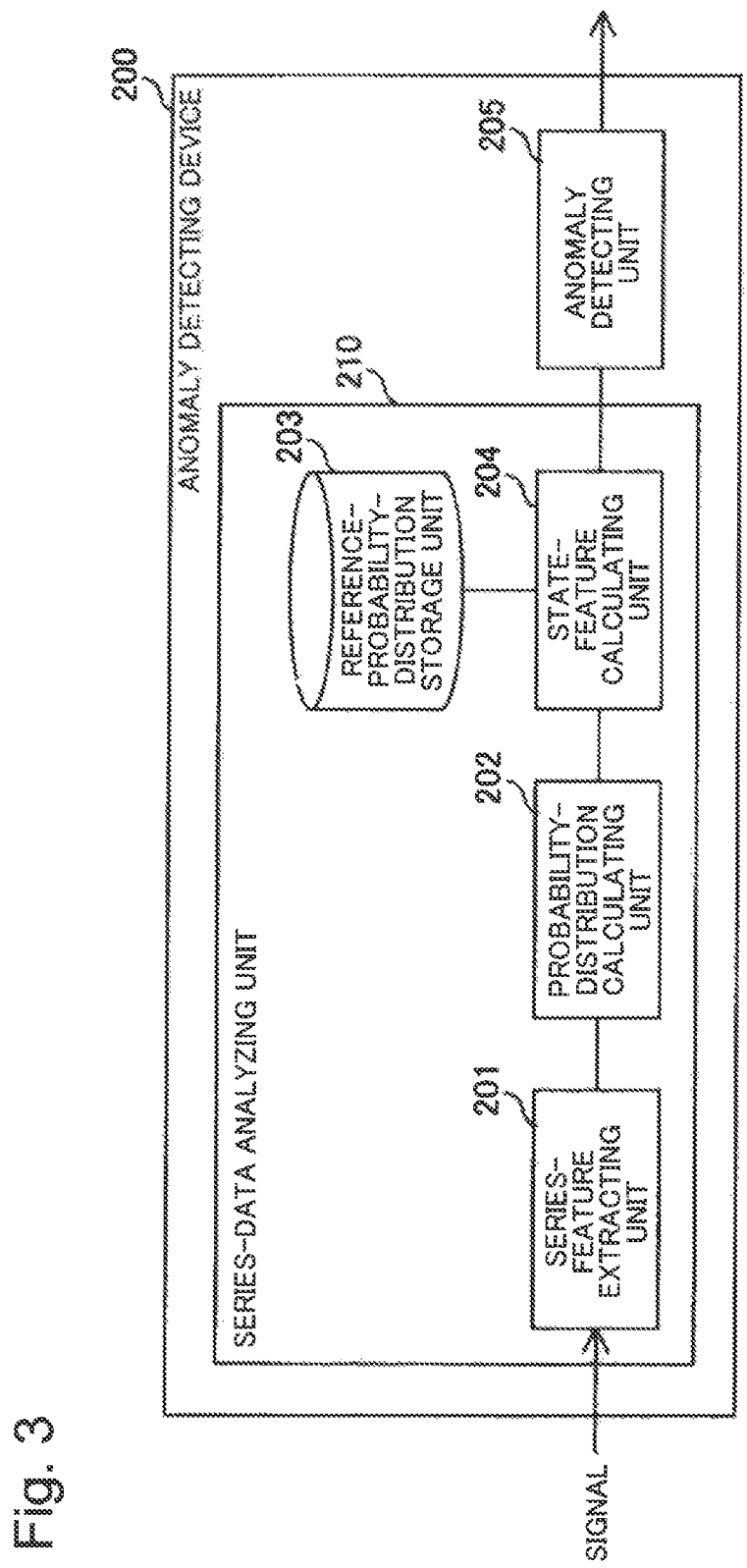
FIG. 3 is a block diagram illustrating a configuration example of an anomaly detecting device according to a second example embodiment.

Next, an anomaly detecting device 200 according to a second example embodiment of the present invention is described. FIG. 3 is a configuration diagram illustrating an example of the anomaly detecting device 200 according to the present example embodiment. The anomaly detecting device 200 illustrated in FIG. 3 includes a series-data analyzing unit 210 and an anomaly detecting unit 205.

The series-data analyzing unit 210 is a processing unit which acquires series data (a signal in FIG. 3) as an input, and outputs a state feature amount, and includes a series-feature extracting unit 201, a probability-distribution calculating unit 202, a reference-probability-distribution storage unit 203, and a state-feature calculating unit 204.

Note that the series-feature extracting unit 201, the probability-distribution calculating unit 202, the reference-probability-distribution storage unit 203, and the state-feature calculating unit 204 relate to the series-feature extracting unit 101, the series-probability-distribution calculating unit 102, the reference-probability-distribution storage unit 103, and the state-feature calculating unit 104 according to the first example embodiment. As illustrated in FIG. 3, the anomaly detecting device 200 may be implemented with these processing units as one combined unit (the series-data analyzing unit 210 in the present example embodiment), or may be individually implemented with the processing units as in the first example embodiment.

In the present example embodiment as well, the series-feature extracting unit 201 extracts a predetermined feature amount (series feature amount) from input series data, and then outputs the feature amount. The probability-distribution calculating unit 202 acquires the series feature amount as an input, and calculates and outputs a probability distribution (series probability distribution) which the input series feature amount follows. The reference-probability-distribution storage unit 203 stores a reference probability distribution. The state-feature calculating unit 204 acquires, as inputs, the series probability distribution and the reference probability distribution, and calculates and outputs a state feature amount, based on the input series probability distribution and the reference probability distribution.

Furthermore, the anomaly detecting unit 205 relates to the anomaly detecting unit 105 according to the first example embodiment. The anomaly detecting unit 205 acquires, as an input, the state feature amount output from the series-data analyzing unit 210, and detects an anomaly.

Hereinafter, processing in each processing unit of the anomaly detecting device 200 is more specifically described, by using a case where input series data are a time-series acoustic signal x(t) as an example.

Herein, t is an index representing time, and is a time index of an acoustic signal sequentially input with a predetermined time (e.g., a time when the device is activated) as an origin, i.e., t=0. Moreover, x(t) is, for example, a digital signal series acquired by analog to digital conversion (AD conversion) of an analog signal recorded with a sensor such as a microphone.

The present example embodiment assumes the following case. A microphone is placed in an environment where an anomaly needs to be detected (hereinafter, referred to as a target environment). Then, an acoustic signal recorded with the microphone is sequentially input to the anomaly detecting device 200. Then, an anomalous change is detected in states of a target environment which changes from moment to moment. In such a case, activity of a person existing in a target environment, operation of an apparatus driven in a target environment, a state of a peripheral environment of a target environment, or the like corresponds to a state of a generation mechanism of series data. The present example embodiment is intended to detect an anomalous change in status of a target environment which changes from moment to moment (more specifically, a state of a generation mechanism of series data).

The series-data analyzing unit 210 acquires series data x(t) as an input, and outputs a state feature amount d(i). Hereinafter, operations of the series-feature extracting unit 201, the probability-distribution calculating unit 202, the reference-probability-distribution storage unit 203, and the state-feature calculating unit 204 constituting the series-data analyzing unit 210 are described.

The series-feature-extracting unit 201 acquires series data x(t) as an input, and extracts and outputs a predetermined series feature amount y(i). Herein, i represents a time frame index. Moreover, y(i) is a vector which stores K-dimensional feature amount at a time frame i. A time frame is a unit of time width for extracting the series feature amount y(i) from the series data x(t). A time width represented by i represents may be determined in accordance with what series feature amount is extracted. For example, when series data are acoustic signals, i is generally set to approximately 10 milliseconds (ms). In this case, t=0 and i=0 are considered as references, and thereby i has such a correlation that t=10 ms when i=1, t=20 ms when i=2, . . . .

A user may select an expression form of a feature amount of a signal designated as a series feature amount, depending on a kind of signal. As a feature amount of an acoustic signal, a publicly known mel-frequency cepstrum coefficients (MFCC) feature amount or the like is widely used in general. When the MFCC feature amount is used, approximately 20 is used as a dimensional number K of a feature amount. Hereinafter, a case where the MFCC feature amount is used for y(i) is described as an example, but a series feature amount is not limited to the MFCC feature amount, and may be any feature amount expressing a frequency and/or power of sound.

The probability-distribution calculating unit 202 calculates and outputs a series probability distribution $p_i(y)$ being a probability distribution which the input series feature amount y(i) follows. In an example of an acoustic signal, the series probability distribution $p_i(y)$ represents what and how much sound is included in a target environment, at a time point of the time frame i. For example, a Gaussian mixture distribution, a hidden Markov model, or the like is used as an expression form of the series probability distribution $p_i(y)$.

When the Gaussian mixture distribution is used, the series probability distribution $p_i(y)$ is represented as in [Equation 1] below.

[Equation 1]

$$p_i(y) \sum_{r=1}^{R} \pi_{r,i} N\left(y \mid \mu_{r,i}, \sum_{r,1}\right) \tag{1}$$

Herein, $N(y|\mu_{r,i}, \Sigma_{r,i})$ represents a K-dimensional Gaussian distribution characterized by a K-dimensional mean vector $\mu_{r,i}$ and a covariance matrix $\Sigma_{r,i}$ of K×K. R represents a total number of Gaussian distributions, r represents an index of each Gaussian distribution, and $\pi_{r,i}$ represents weight of an r-th Gaussian distribution.

Note that, when the hidden Markov model is used, it is only necessary to designate, as a latent state, a state of a mechanism for generating series data, designate, as observation data, a series feature amount being a feature amount of series data generated therefrom, and then calculate, from the series data, a probability that the series data are observed, and a transition probability of the state of the mechanism.

A reference probability distribution $p_s(y)$ is stored in the reference-probability-distribution storage unit 203. For example, a probability distribution in an expression form similar to the series probability distribution $p_i(y)$ is used for the reference probability distribution $p_s(y)$. When the Gaussian mixture distribution is used, the reference probability distribution $p_s(y)$ is represented as in [Equation 2] below.

[Equation 2]

$$p_s(y) = \sum_{r=1}^{R} \pi_{r,s} N\left(y \mid \mu_{r,s}, \sum_{r,s}\right) \tag{2}$$

The state-feature calculating unit 204 acquires the series probability distribution $p_i(y)$ and the reference probability distribution $p_s(y)$ as inputs, and extracts the state feature amount d(i) representing a fluctuation condition of the series probability distribution $p_i(y)$ viewed from the reference probability distribution $p_s(y)$.

In the present example embodiment, the state-feature calculating unit 204 uses, as the state feature amount d(i), a distance, between input probability distributions, calculated by a predetermined method. The state-feature calculating unit 204 may use, for example, Kullback-Leibler divergence (KL divergence) between $p_s(y)$ and $p_i(y)$ or the like, as the state feature amount d(i). In addition, it is conceivable that, when the Gaussian mixture distribution is used for a probability distribution as an example of the state feature amount d(i), the state-feature calculating unit 204 uses the following distance. The distance is a vector in which R numbers of KL divergences of respective r-th Gaussian distributions are arranged, a norm of the vector, an R-dimensional vector in which R numbers of square distances of mean vectors of respective r-th Gaussian distributions are arranged, a norm of the R-dimensional vector, or the like.

For example, when an R-dimensional vector in which R numbers of square distances of mean vectors of respective r-th Gaussian distributions are arranged is used, the state feature amount d(i) becomes a vector value represented by [Equation 3] below.

[Equation 3]

$$d(i)=[(\mu_{1,i}-\mu_{1,s})^2, \ldots, (\mu_{r,i}-\mu_{r,s})^2, \ldots, (\mu_{R,i}-\mu_{R,s})^2] \tag{3}$$

Furthermore, for example, when a norm of an R-dimensional vector in which R numbers of square distances of mean vectors of respective r-th Gaussian distributions are arranged is used as the state feature amount d(i), the state feature amount d(i) becomes a scalar value represented by [Equation 4] below.

[Equation 4]

$$d(i)=(\mu_{1,i}-\mu_{1,s})^2+\ldots+(\mu_{r,i}-\mu_{r,s})^2+\ldots+(\mu_{R,i}-\mu_{R,s})^2 \tag{4}$$

In the case of a vector value, the state feature amount d(i) becomes a feature amount representing a direction of a change from the reference probability distribution $p_s(y)$ to the series probability distribution $p_i(y)$. Furthermore, in the case of a scalar value, the state feature amount d(i) becomes a feature amount representing magnitude of a change from $p_s(y)$ to $p_i(y)$.

Hereinafter, the state feature amount d(i) is described as a scalar value. However, in the case of a vector value, the anomaly detecting device 200 may alter the anomaly detecting unit 205 at a subsequent stage into a format related to a vector value such as to change to an anomaly detecting method in which a vector value is acquired as an input.

The reference-probability-distribution storage unit 203 may hold, as the reference probability distribution $p_s(y)$, for example, a probability distribution previously calculated by using, as series data for calculating a reference probability distribution, series data when a generation mechanism of series data is in a predetermined state.

Note that, although illustration is omitted, the anomaly detecting device 200 may include, at a stage prior to the reference-probability-distribution storage unit 203, a reference-probability-distribution generation unit that calculates a reference probability distribution from series data for calculating a reference probability distribution and then stores the reference probability distribution in the reference-probability-distribution storage unit 203.

The reference-probability-distribution storage unit 203 may hold, as series data for calculating a reference probability distribution, for example, a probability distribution calculated by using an acoustic signal recorded in a silent late-night situation. In this case, the state feature amount d(i) becomes a feature amount representing a fluctuation condition of how a state of a target environment in a time frame i changes as compared with a state of a silent target environment. Otherwise, a probability distribution calculated by using all acoustic signals recorded for one day, or a probability distribution calculated by using an acoustic signal in a particular time interval of interest may be used as a reference probability distribution. Moreover, for example, when a state feature amount is calculated from the series probability distribution $p_i(y)$, the reference-probability-distribution storage unit 203 may use a series probability distribution $p_{i-1}(y)$ as a reference probability distribution.

Figure 4:
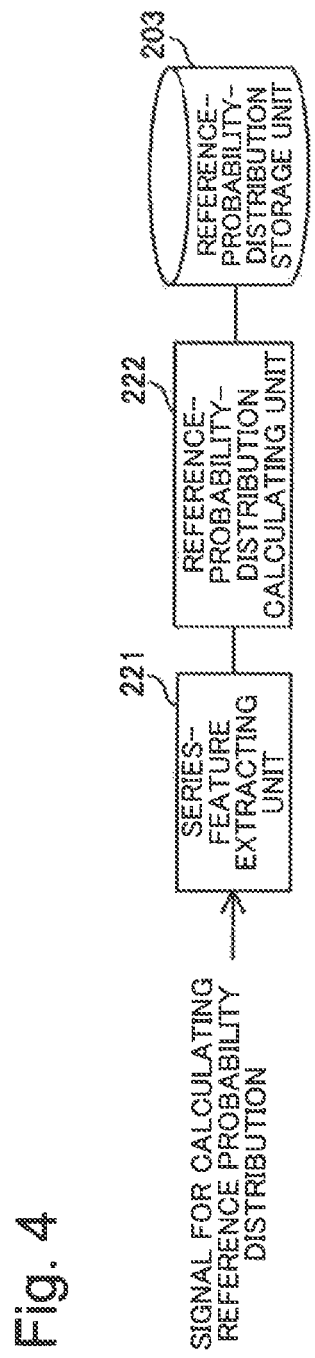
FIG. 4 is a block diagram illustrating an example of a reference-probability-distribution generation unit.

Herein, a reference probability distribution calculation method is described with reference to FIG. 4. FIG. 4 is a block diagram illustrating an example of the above-described reference-probability-distribution generation unit. In the reference probability distribution calculation method, first, series data for calculating a reference probability distribution (a signal for calculating a reference probability distribution in FIG. 4) are input to a series-feature extracting unit 221. The series-feature extracting unit 221 extracts and outputs a series feature amount from input series data for calculating a reference probability distribution. Next, a reference-probability-distribution calculating unit 222 acquires the calculated series feature amount as an input, calculates a probability distribution thereof, and stores the probability distribution in the reference-probability-distribution storage unit 203. Note that operations of the series-feature extracting unit 221 and the reference-probability-distribution calculating unit 222 may be similar to those of the series-feature extracting unit 201 and the probability-distribution calculating unit 202. Moreover, prepared data, or past data (particularly, series data which are not determined to be anomalous) acquired during an operation of the anomaly detecting device 200 may be used for series data for calculating a reference probability distribution. In the latter case, the reference-probability-distribution generation unit may successively calculate a reference probability distribution.

Note that the operations of the series-feature extracting unit 221 and the reference-probability-distribution calculating unit 222 in the reference-probability-distribution generation unit may be performed by the series-feature extracting unit 201 and the probability-distribution calculating unit 202 of the series-data analyzing unit 210.

The anomaly detecting unit 205 acquires the state feature amount d(i) as an input, and senses an anomalous state of a generation mechanism of series data x(t). The anomaly detecting unit 205 may designate, as second series data, for example, data in which state feature amounts d(i) are arranged in a time-series form, statistically process the second series data, and then detect an anomaly (a statistical outlier or a change point in a state of a generation mechanism). The anomaly detecting unit 205 can use a method described in above-described PTL 1 as statistical processing. In this case, the anomaly detecting unit 205 sequentially inputs the state feature amount d(i) for each time frame as series data, and models the probability generated by such series data (a series including prior state feature amount), by representing a probability. Then, the anomaly detecting unit 205 may detect a statistical outlier or a change point in a state of a generation mechanism, based on an outlier score calculated based on a modeled probability distribution and input series data (a latest state feature amount d(i)).

Note that the operation in the present example embodiment is only different in that generation processing for reference probability distribution is separately performed (as preprocessing of anomaly detecting processing, or in parallel with anomaly detecting processing), and is basically similar to that in the first example embodiment. Note that the generation processing for reference probability distribution may be performed by a device other than the anomaly detecting device 200. Moreover, in the following present example embodiment, there is a case where operations in the step S102 to the step S104 in the first example embodiment illustrated in FIG. 2 are referred to as series data analyzing processing.

Figure 5:
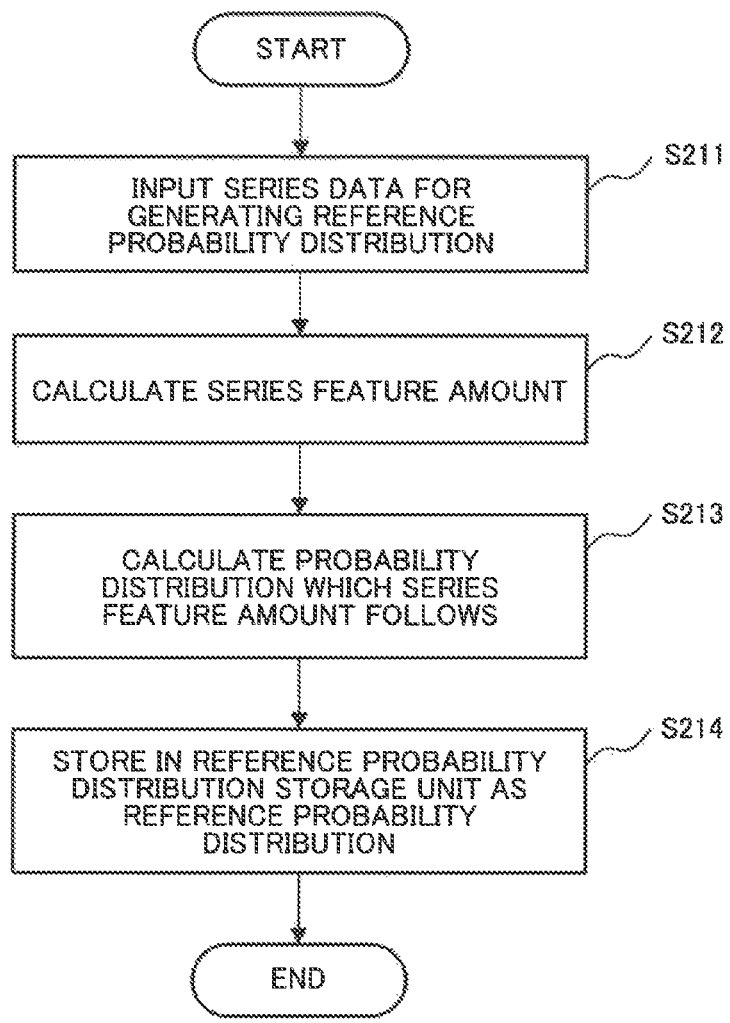
FIG. 5 is a flowchart illustrating one example of a processing flow of reference-probability-distribution generation processing.

FIG. 5 is a flowchart illustrating an example of a processing flow of reference-probability-distribution generation processing. In the example illustrated in FIG. 5, first, when series data for generating a reference probability distribution are input (step S211), the series-feature extracting unit 221 extracts a series feature amount from the input series data for generating a reference probability distribution (step S212).

Next, the reference-probability-distribution calculating unit 222 calculates a probability distribution which the calculated series feature amount follows (step S213), and stores the probability distribution in the reference-probability-distribution storage unit 203 as a reference probability distribution (step S214).

As described above, based on the present example embodiment, it is possible to accurately detect an anomaly from series data generated from a generation mechanism involving a change in a state, as in the first example embodiment.

In contrast, the method described in PTL 1 is a method of sensing a change point or an outlier, based on a series feature amount output by the series-feature extracting unit 201 referred to in the present example embodiment. Thus, in a situation where a generation mechanism of series data changes from moment to moment, all the changes of the generation mechanism are sensed as sensing targets, and therefore, it is not possible to determine whether the change is normal or anomalous to the generation mechanism. The present example embodiment detects an anomaly by using a state feature amount based on a fluctuation condition of a state in a generation mechanism of input series data with respect to a reference state, and therefore solves such an issue.

Example Embodiment 3

Figure 6:
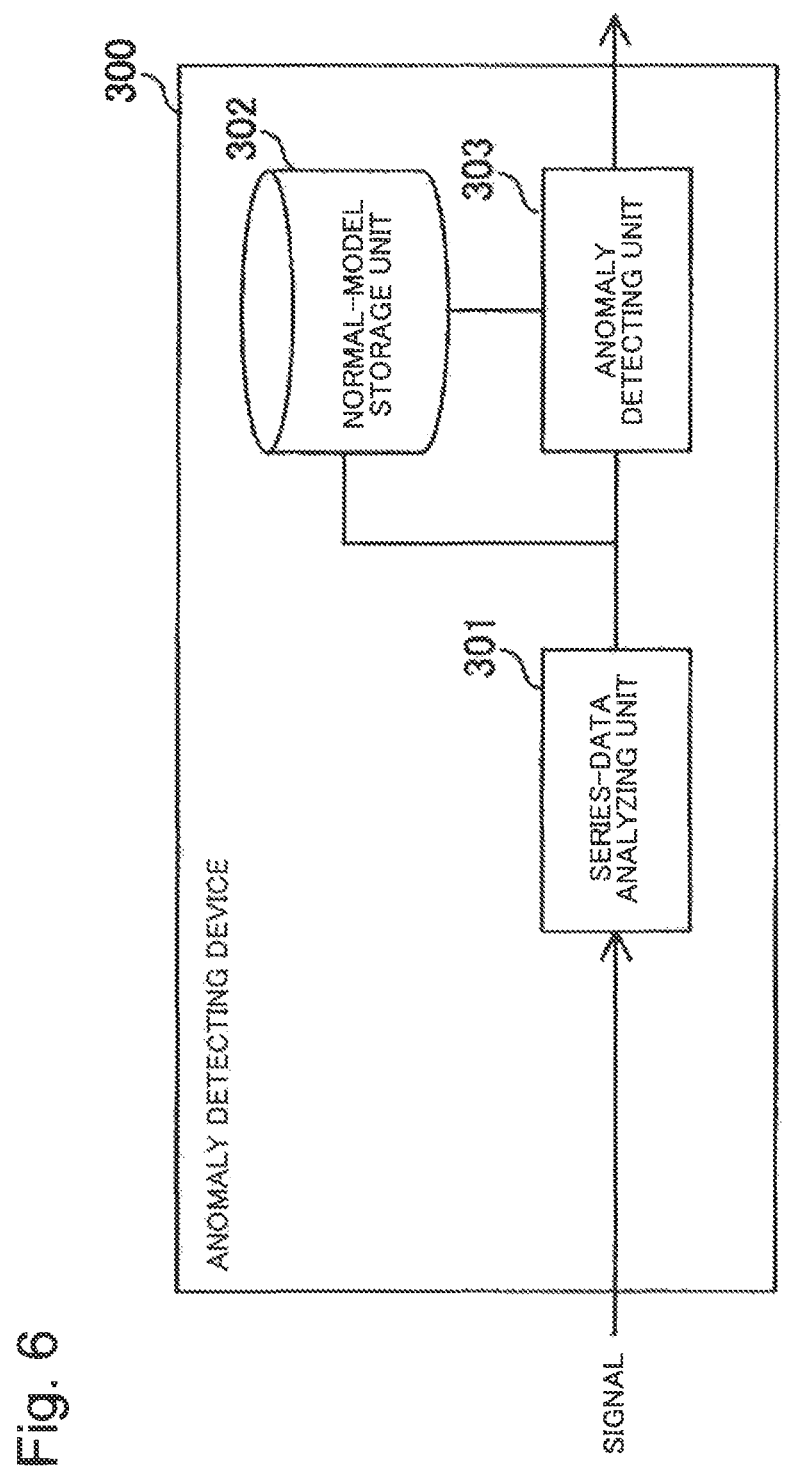
FIG. 6 is a block diagram illustrating a configuration example of an anomaly detecting device according to a third example embodiment.

Next, an anomaly detecting device 300 according to a third example embodiment of the present invention is described. FIG. 6 is a configuration diagram illustrating an example of the anomaly detecting device 300 according to the present example embodiment. The anomaly detecting device 300 illustrated in FIG. 6 includes a series-data analyzing unit 301, a normal-model storage unit 302, and an anomaly detecting unit 303.

The series-data analyzing unit 301 may be similar to the series-data analyzing unit 210 according to the second example embodiment. In other words, the series-data analyzing unit 301 acquires the series data x(t) (a signal in FIG. 6) as an input, and calculates and outputs the state feature amount d(i).

The normal-model storage unit 302 stores a normal model in which a state feature amount in a normal state (normal time) is modeled. The normal model may be, for example, a probability distribution of a state feature amount in a normal state at a time point indicated by a model index signifying at least a time within a particular period. Alternatively, for example, the normal-model storage unit 302 may store a plurality of normal models related to a plurality of model indexes signifying different times within a particular period.

Note that, although illustration is omitted, the anomaly detecting device 300 may include, at a stage prior to the normal-model storage unit 302, a normal-model generation unit that calculates a normal model from series data for calculating a normal model and then stores the normal model in the normal-model storage unit 302.

Figure 7:
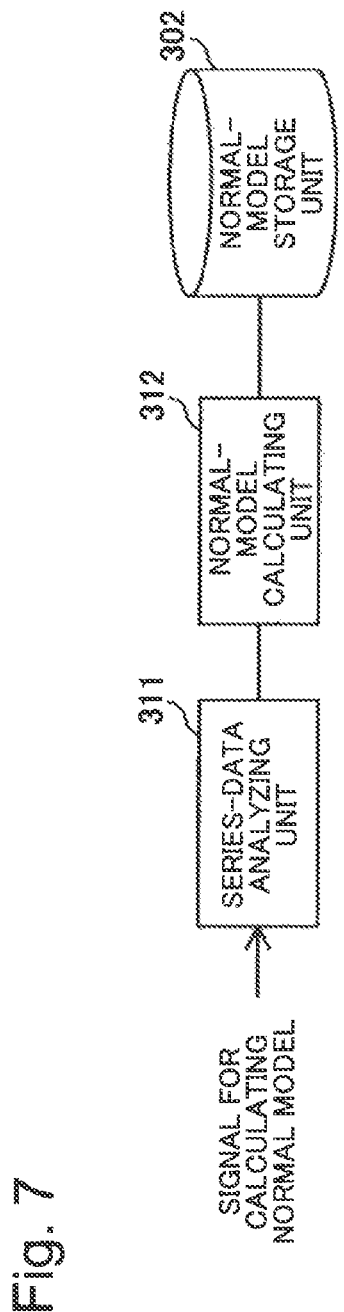
FIG. 7 is a block diagram illustrating an example of a normal-model generation unit.

FIG. 7 is a block diagram illustrating an example of the normal-model generation unit. In a normal model calculation method, first, series data for calculating a normal model (a signal for calculating a normal model in FIG. 7) are input to a series-data analyzing unit 311. The series-data analyzing unit 311 calculates a state feature amount from the input series data for calculating a normal model. Next, a normal-model calculating unit 312 acquires the calculated state feature amount as an input, models status of a periodic change of the state feature amount, and stores the model in the normal-model storage unit 302 as a normal model. Note that an operation of the series-data analyzing unit 311 may be similar to that of the series-data analyzing unit 301. Moreover, prepared data, or past data (particularly, series data which are not determined to be anomalous) acquired during an operation of the anomaly detecting device 300 may be used for series data for calculating a normal model. In the latter case, the normal-model generation unit may successively calculate a normal model.

Note that the operation of the series-data analyzing unit 311 in the normal-model generation unit may be performed by the series-data analyzing unit 301.

Hereinafter, a case where a probability distribution $q_m(d(i))$ of a state feature amount $d(i)$ of a time frame i related to m is used as a normal model is described as an example. Herein, m is an index regarding a model.

Hereinafter, a normal model generation method and an example of m are described by using, as an example, a case of detecting an anomaly of a facility from an acoustic signal. Sound generated in a facility or the like ordinarily changes with a period of one day, based on human activity. For example, it is assumed that a microphone is placed at an entrance of a school building for detection of an anomaly in a school facility or the like. In this case, at an entrance of a school building, there is almost no sound early in morning, and it rapidly becomes noisy with student's voice at a time of going to school. At an entrance of a school building, in daytime, a quiet time period and a noisy time period alternately repeat with a rapid change in accordance with repetitions of a lecture and a recess. Then, at an entrance of a school building, it gradually becomes silent after a time of leaving school, and night comes. In this way, a change of sound repeats with a 24-hour period. Along with such a change, the state feature amount $d(i)$ also changes with a 24-hour period.

As already described, i is a time frame index, and keeps increasing in value while the device keeps operating with a predetermined time (e.g., a device operation start time) as 0. Considering a case where a normal model of each time in one day is made under such a condition, the normal-model generation unit needs only to designate m as a model index defined by a time (10:10 or the like) irrespective of date. For example, assuming that time width of a time frame i is one minute, and an actual time with an origin i=0 is 18:00 of a certain day, i=1440 also becomes 18:00. When m is defined by time by utilizing the property described above, the normal-model generation unit calculates $q_m(d(i))$ by using a plurality of such $d(i)$s that i becomes the time m. Such $q_m(d(i))$ is based on a premise that a state at the normal time m is observed with variation in accordance with a day (period) under a certain average.

When such $q_m(d(i))$ is represented by a Gaussian distribution, $q_m(d(i))$ becomes as in [Equation 5] below.

[Equation 5]

$$q_m(d(i))=N(d(i)|\mu_m,\Sigma_m) \quad (5)$$

Note that, instead of the Gaussian distribution, the normal-model generation unit may use, for example, a Gaussian mixture distribution or a hidden Markov model, as an expression form of the normal model $q_m(d(i))$. Note that, when the hidden Markov model is used, the normal-model generation unit designates a state of a generation mechanism of series data as a latent state. Then, the normal-model generation unit needs only to designate, as observation data, a state feature amount indicating a fluctuation condition of a series feature amount being a feature amount of series data generated from the generation mechanism with respect to a reference, and then calculate a probability that the state feature amount is observed in a normal state, and a transition probability of a state of a generation mechanism.

Furthermore, in the above-described example, an example in which a normal model is generated by using 24 hours as a unit of a period is described, but, when an activity period of a generation mechanism of series data to be a target is known in advance, a normal model needs only to be generated by using m defined by the activity period. For example, when a state (activity contents) of a generation mechanism of series data changes in accordance with not only time but also day of week, m may be defined by day of week and time, and a normal model related to time for each day of week may be generated. Moreover, for example, when a normal model related to repetitions of a lecture and a recess thereof at school needs to be generated, a user can freely set a period of generating a normal model so that m is defined in accordance to lengths of a lecture and a recess or the like. In addition, for a normal model, it is also possible to use a combination of a plurality of normal models, such as a normal model for each day of week, and a normal model for repetitions of a lecture and a recess thereof. In this case, one state feature amount may be used for generation of a plurality of normal models.

Based on a state feature amount $d(i)$ input from the series-data analyzing unit 301, the anomaly detecting unit 303 senses and outputs presence or absence of an anomaly in a state of a generation mechanism of series data input to the anomaly detecting device 300. For example, the anomaly detecting unit 303 may calculate a score representing a probability that a normal model, which is indicated by using m to which i of an input state feature amount $d(i)$ is related, takes the state feature amount $d(i)$, and then sense presence or absence of an anomaly, based on the score. A score may be, for example, a probability value acquired by substituting an input state feature amount $d(i)$ for a probability distribution $q_m(d(i))$ stored in the normal-model storage unit 302 as a normal model. In this case, the anomaly detecting unit 303 may determine that there is an anomaly when a calculated score is less than a previously defined threshold, and may determine that there is no anomaly when a calculated score is equal to or more than the threshold.

Figure 8:
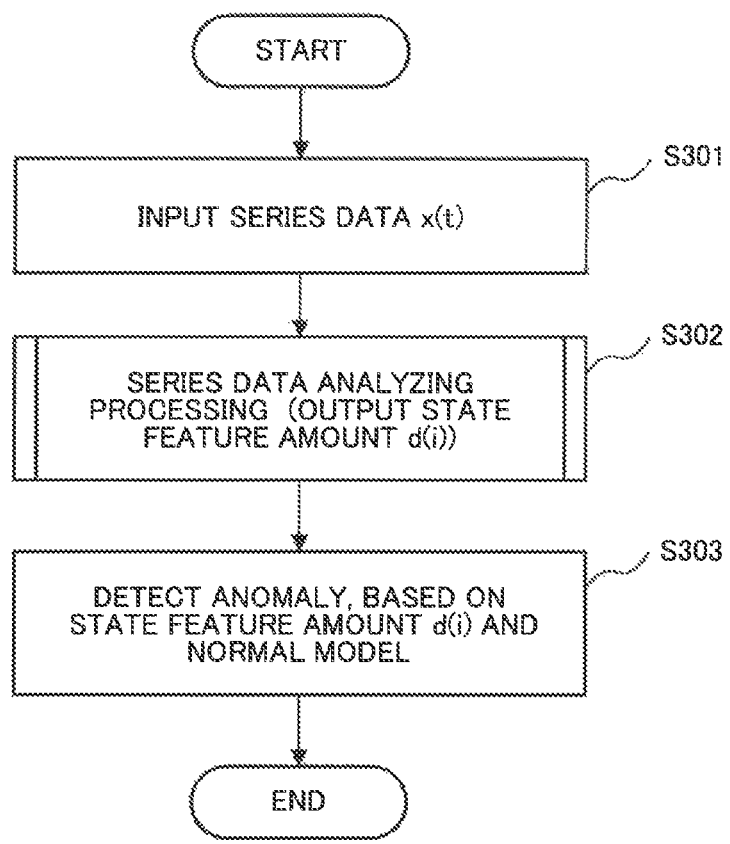
FIG. 8 is a flowchart illustrating one example of an operation of the anomaly detecting device according to the third example embodiment.

Next, an operation in the present example embodiment is described. FIG. 8 is a flowchart illustrating one example of an operation of the anomaly detecting device 300 according to the present example embodiment.

In the example illustrated in FIG. 8, first, series data x(t) are input to the anomaly detecting device 300 (step S301).

Next, the series-data analyzing unit 301 performs analyzing processing of series data for the input series data x(t), and outputs an acquired state feature amount $d(i)$ (step S302).

Finally, the anomaly detecting unit 303 detects an anomaly of the series data x(t), based on the state feature amount $d(i)$, and a normal model stored in the normal-model storage unit 302 (step S303).

Note that, although illustration is omitted, the anomaly detecting device 300 may perform normal model generation processing as preprocessing of the above-described anomaly detecting processing, or in parallel with the anomaly detecting processing.

As described above, based on the present example embodiment, in addition to an advantageous effect in the second example embodiment, it is possible to sense not only an anomaly on a time series but also an anomaly based on a period of a state change of a generation mechanism of input series data. Therefore, based on the present example embodiment, it is possible to detect an anomaly viewed not only on a time series but also from any period.

Example Embodiment 4

Figure 9:
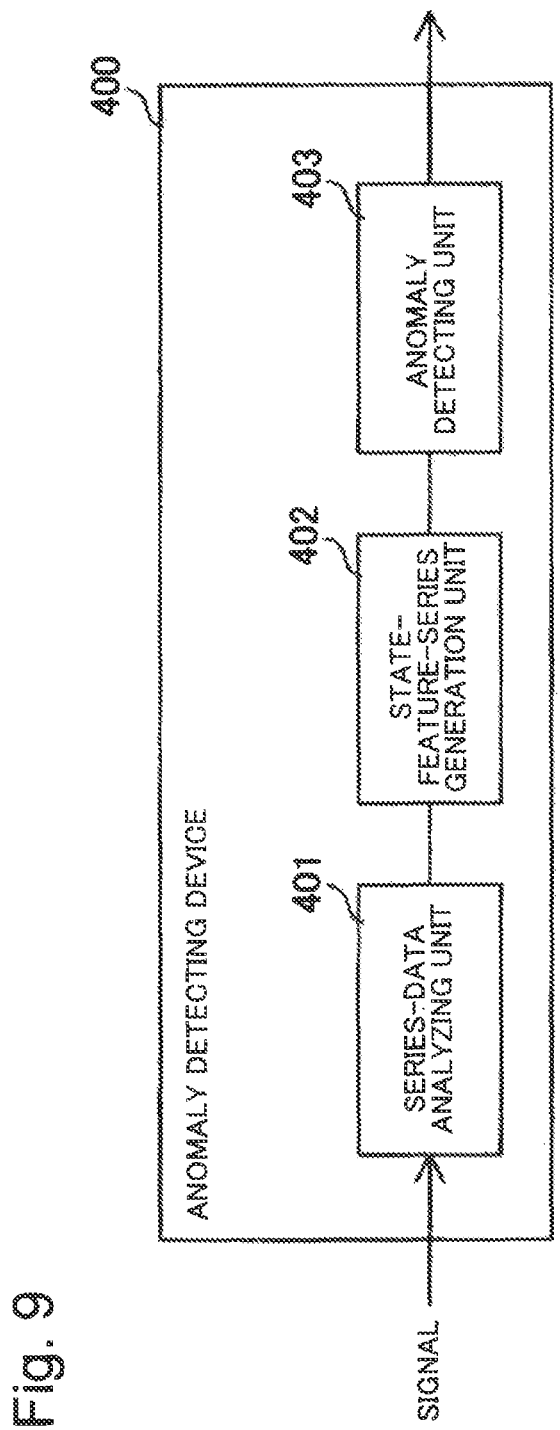
FIG. 9 is a block diagram illustrating a configuration example of an anomaly detecting device according to a fourth example embodiment.

Next, an anomaly detecting device 400 according to a fourth example embodiment of the present invention is described. FIG. 9 is a configuration diagram illustrating an example of the anomaly detecting device 400 according to the present example embodiment. The anomaly detecting device 400 illustrated in FIG. 9 includes a series-data analyzing unit 401, a state-feature-series generation unit 402, and an anomaly detecting unit 403.

The series-data analyzing unit 401 is similar to the series-data analyzing unit 210 according to the second example embodiment. In other words, the series-data analyzing unit 401 acquires the series data x(t) (a signal in FIG. 9) as an input, and calculates and outputs the state feature amount d(i).

The state-feature-series generation unit 402 acquires the state feature amount d(i) as an input, and outputs the state feature amount series $d_2(y)$. Herein, the state feature amount series $d_2(j)$ is a vector having a same dimensional number as d(i) acquired based on conversion (reconstruction) of the state feature amount d(i), or a scalar value. Moreover, j is an index regarding a state feature amount series.

Hereinafter, a generation method for a state feature amount series and an example of j are described by using, as an example, a case of detecting an anomaly of a facility from an acoustic signal. As already described, sound generated in a facility or the like ordinarily changes with a predetermined period (e.g., 24 hours) in accordance with human activity. This represents that a state feature amount also changes with a predetermined period.

Accordingly, j may be defined as an index of a time frame within such a period. For example, by assuming that time width of a time frame i is one minute, and an actual time with an origin i=0 is January 1, at 18:00, i=1440 becomes January 2, at 18:00. In such a case, j may be defined as a minute-by-minute time frame index within a 24-hour period. Then, $d_2(j)$ becomes a series of a state feature amount at each time indicated by j in one day. In other words, in the above-described example, when $j_1$=18:00 is defined, the time frame i is represented as data in which d(i)s related to 18:00 are arranged as $d_2(j_1)$=[d(0), d(1440), . . . ].

Furthermore, a case where a period is 24 hours has been described as an example this time. However, when an activity period of a generation mechanism of series data to be a target is known in advance, j needs only to be defined based on the activity period. In this instance, for example, when a state feature amount series needs to be generated for each time of each day of week, y may be defined by a day of week and time. Moreover, for example, such that, when a state feature amount series related to repetitions of a lecture and a recess thereof at school needs to be generated, j is defined in such a way as to be related to lengths of a lecture and a recess, a user may freely set a period of extracting a state feature amount as an element of a state feature amount series. In this instance, j is preferably defined in such a way that a state feature amount of a time frame that can be regarded as a same state in a state of a generation mechanism of repeated series data can be extracted. Note that definition of j is not limited to one definition. For example, state feature amount series related to a plurality of periods may be generated such as a state feature amount series for each day of week, and state feature amount series for each lecture and for each recess. In this case, one state feature amount may be used for generation of a plurality of state feature amount series.

The anomaly detecting unit 403 acquires the state feature amount series $d_2(j)$ as an input, and senses an anomalous state of a generation mechanism of series data x(t). The anomaly detecting unit 403 may detect presence or absence of an anomaly from the state feature amount series $d_2(j)$, for example, by using the method described in above-described PTL 1. In this case, for each j, the anomaly detecting unit 403 sequentially inputs the state feature amount series $d_2(j)$ as series data. Then, the anomaly detecting unit 403 models a probability that such series data (e.g., a series of the state feature amount d(i) having the prior time frame i related to the j) are generated, by representing the probability with a probability distribution. Then, the anomaly detecting unit 403 may detect a statistical outlier or a change point in a state of a generation mechanism, based on an outlier score calculated based on a modeled probability distribution and input series data (a latest state feature amount d(i) having a time frame i related to the j).

Figure 10:
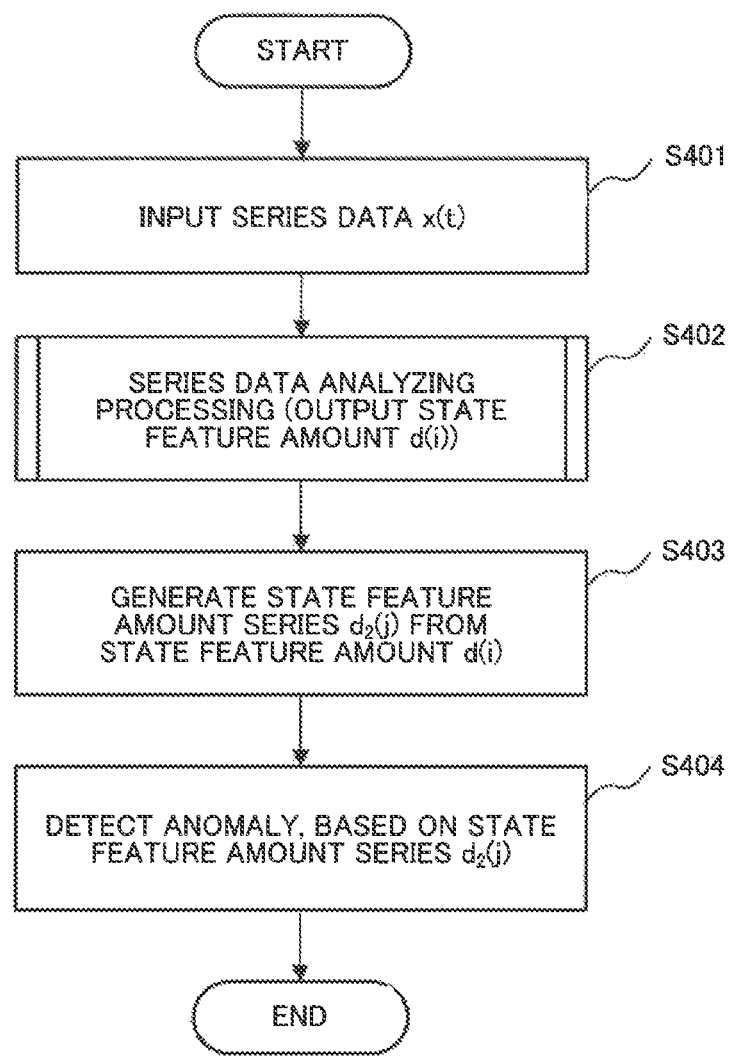
FIG. 10 is a flowchart illustrating one example of an operation of the anomaly detecting device according to the fourth example embodiment.

Next, an operation in the present example embodiment is described. FIG. 10 is a flowchart illustrating one example of an operation of the anomaly detecting device 400 according to the present example embodiment. Note that operations in a step S401 to a step S402 are similar to those in the step S301 to the step S302 according to the third example embodiment.

In the present example embodiment, when a state feature amount d(i) is calculated in series data analyzing processing (step S402), the state-feature-series generation unit 402 generates a state feature amount series $d_2(j)$ from the state feature amount d(i) (step S403).

Finally, the anomaly detecting unit 403 detects an anomaly of series data x(t), based on the state feature amount series $d_2(j)$ (step S404).

As described above, based on the present example embodiment, in addition to an advantageous effect in the second example embodiment, it is possible to detect not only an anomaly on a time series but also an anomaly based on a period of a state change of a generation mechanism of input series data. Therefore, based on the present example embodiment, it is possible to detect an anomaly viewed not only on a time series but also from any period.

Example Embodiment 5

Figure 11:
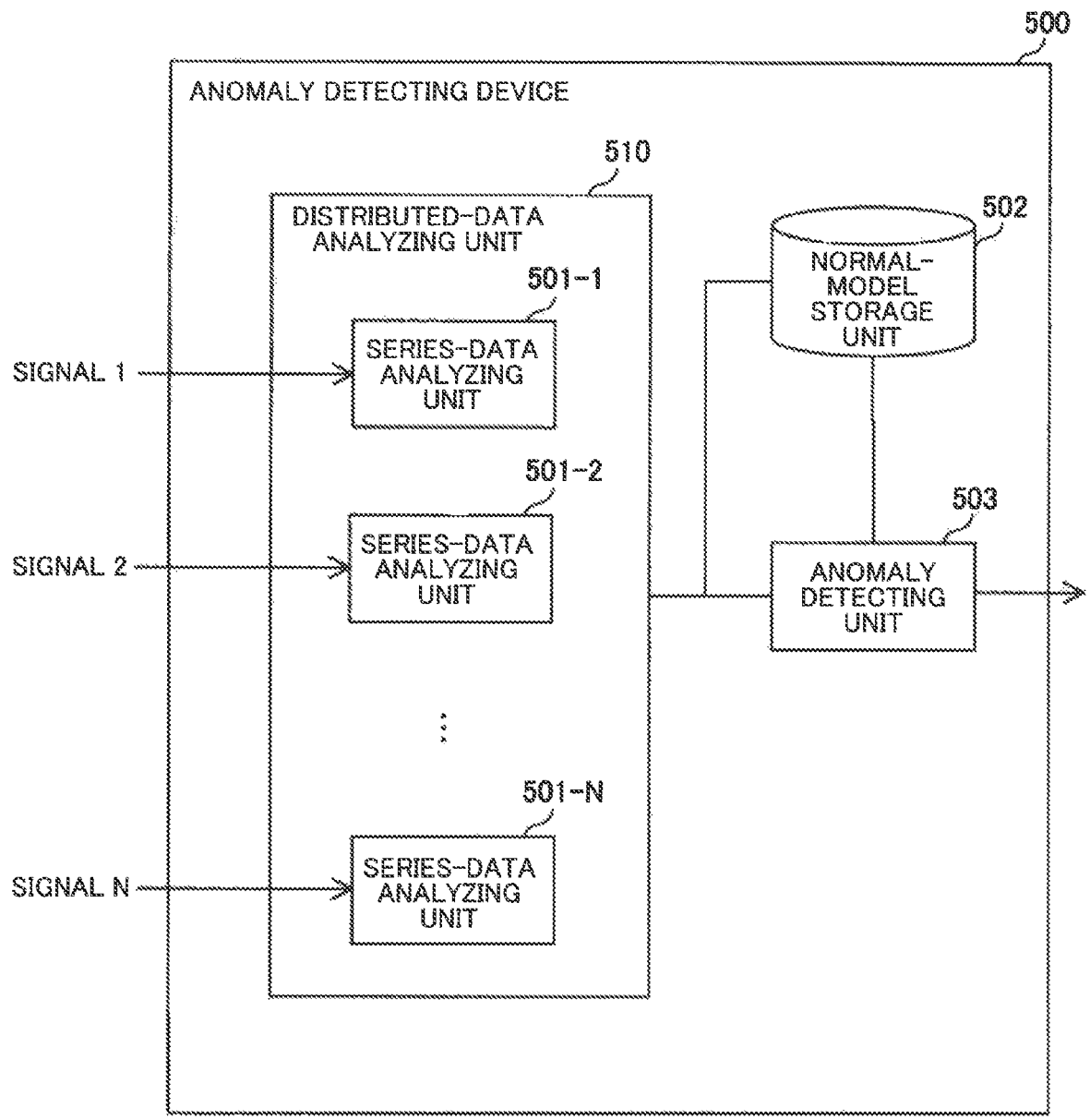
FIG. 11 is a block diagram illustrating a configuration example of an anomaly detecting device according to a fifth example embodiment.

Next, an anomaly detecting device 500 according to a fifth example embodiment of the present invention is described. FIG. 11 is a configuration diagram illustrating an example of the anomaly detecting device 500 according to the present example embodiment. The anomaly detecting device 500 illustrated in FIG. 11 includes a distributed-data analyzing unit 510, a normal-model storage unit 502, and an anomaly detecting unit 503.

The distributed-data analyzing unit 510 is a processing unit which acquires each piece of series data $x_1(t), \ldots,$ and $x_N(t)$ (signals 1 to N in FIG. 11) generated from N numbers of generation mechanisms as an input, and calculates a state feature amount from each piece of series data. The distributed-data analyzing unit 510 includes N numbers of series-data analyzing units 501 (series-data analyzing units 501-1 to 501-N).

The series-data analyzing units 501-1 to 501-N respectively acquire series data $x_n(t)$ related to themselves as an input, and output state feature amounts $d(i,n)$. Herein, n represents an index of a generation mechanism of series data (hereinafter, referred to as a mechanism index). For example, the series-data analyzing unit 501-1 acquires series data $x_1(t)$ as an input, and outputs a state feature amount $d(i,1)$.

Hereinafter, in order to detect an anomaly from acoustic signals, a case in which N numbers of microphones are spatially distributed in an environment where an anomaly needs to be detected (a target environment) is considered. In such a case, a generation mechanism of series data $x_n(t)$ is equivalent to a peripheral environment of a microphone recording an acoustic signal ($x_n(t)$). In this case, n may be defined as an identifier of a microphone, or may be defined as an index of a space where a microphone is placed (e.g., a three-dimensional coordinate of a place where a microphone is placed). Alternatively, n may be defined as an identifier of a place where a microphone is placed. For example, when a microphone is placed in each classroom for anomaly detection in a school facility, n may be defined as an index of a classroom where a microphone is placed.

Figure 12:
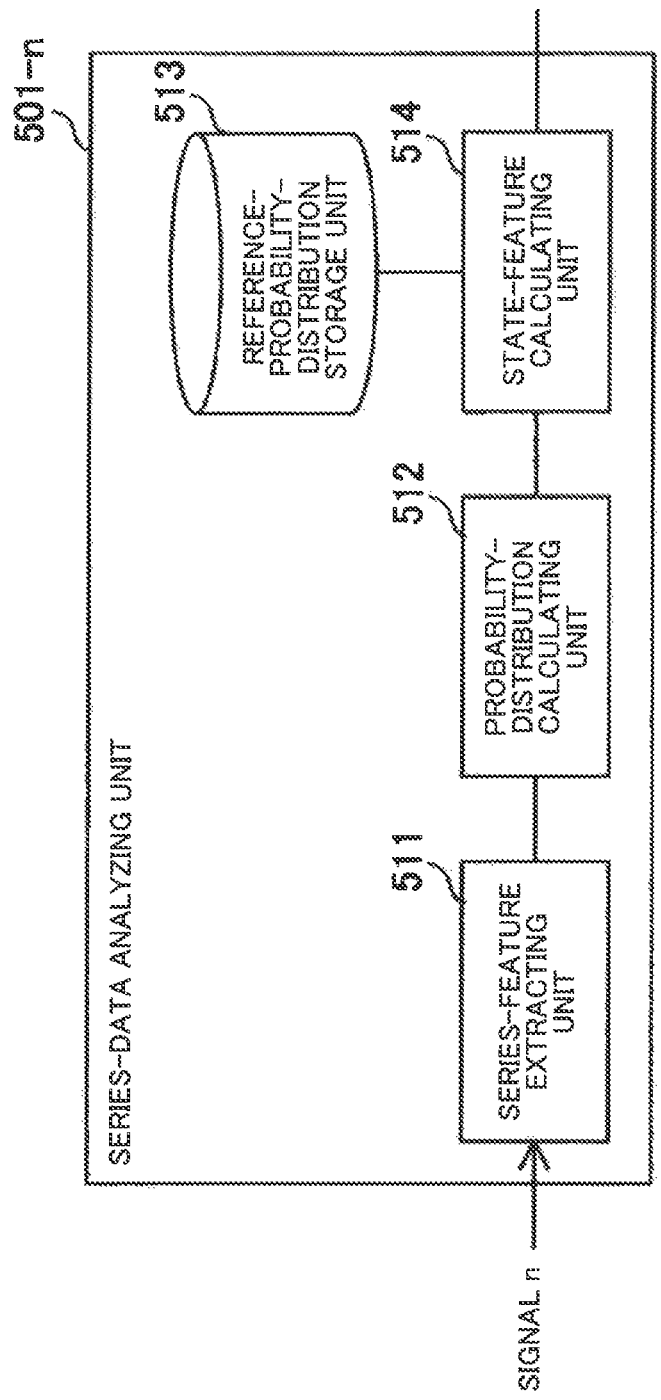
FIG. 12 is a block diagram illustrating an example of a series data analyzing unit.

FIG. 12 is a block diagram illustrating a configuration example of the series-data analyzing units 501-n. As illustrated in FIG. 12, each series-data analyzing unit 501 includes a series-feature extracting unit 511, a probability-distribution calculating unit 512, a reference-probability-distribution storage unit 513, and a state-feature calculating unit 514. Note that operations of the series-feature extracting unit 511 and the probability-distribution calculating unit 512 are basically similar to those of the series-feature extracting unit 201 and the probability-distribution calculating unit 202 according to the second example embodiment. Similarly, operations of the reference-probability-distribution storage unit 513 and the state-feature calculating unit 514 are basically similar to those of the reference-probability-distribution storage unit 203 and the state-feature calculating unit 204 according to the second example embodiment.

Note that the reference-probability-distribution storage unit 513 can also store a reference probability distribution in a predetermined generation mechanism as a reference probability distribution. This is because an input of the anomaly detecting device 500 is each piece of series data generated from N numbers of generation mechanisms. In other words, in the anomaly detecting device 200 in which one piece of series data is input, a reference probability distribution represents a state of a target environment at a predetermined time. In contrast, in the present example embodiment, a normal state in a generation mechanism indicated by a mechanism index n can be defined as a reference.

For example, it is supposed that, when N numbers of microphones are spatially distributed, a peripheral state of the place represented by using the acoustic signal $x_{n1}(t)$ acquired from the microphone placed at a first place (n=n1) is designated as a reference. In such a case, the state feature amount $d(i,n)$ represent a feature of the peripheral state of the place indicated by the n when a peripheral state of the first place (n1) is regarded as a reference. In such a case, it is possible to sense an anomalous state by using not only a relationship in a time series but also a relationship (a spatial relationship when an acoustic signal is referred to) among a plurality of generation mechanisms. Note that a generation mechanism to be a reference may differ according to n.

The normal-model storage unit 502 stores a normal model in which a state feature amount $d(i,n)$ in a normal state is modeled. Note that, although illustration is omitted, the anomaly detecting device 500 may include, at a stage prior to the normal-model storage unit 502, the normal-model generation unit that generates a normal model from the state feature amount $d(i,n)$ and stores the normal model in the normal-model storage unit 502.

Hereinafter, a case where a probability distribution $q_m(d(i))$ of a state feature amount $d(i,n)$ is used as a normal model is described as an example. Herein, m is an index regarding a model. Note that, although m in the third example embodiment is an index relating to time, m in the present example embodiment is related to a mechanism index n in addition to time. For example, the normal-model generation unit may define m as "n related to the first place (n1)", and then generate a normal model by using a state feature amount of the first place (n=n1). Alternatively, the normal-model generation unit may define m as "n and i at a time 18:00 related to the first place (n1)", and then generate a normal model by using a state feature amount in which i is related to the time 18:00 among state feature amounts of the first place (n=n1). Moreover, for example, the normal-model generation unit may define m as "n related to n'(≠n) in which the first place (n1) is regarded as a reference", and then generate a normal model by using a feature amount of n in which the first place (n1) is regarded as a reference. In addition, as in the third example embodiment, the normal-model generation unit may define m by combining a plurality of aspects (a day of week and time, a place and a reference, and the like) regarding a time and a mechanism index. Alternatively, the normal-model generation unit may generate a plurality of kinds of normal models by using a plurality of kinds of ms (m1, m2, . . . and the like) defined in accordance with the respective aspects.

Note that a normal model generation method may be similar to that in the third example embodiment. A normal model may be, for example, a probability distribution $q_m(d(i,n))$ of a state feature amount $d(i,n)$ of a time frame i and a mechanism index n related to m.

The anomaly detecting unit 503 senses and outputs presence or absence of an anomaly in a state of a generation mechanism of series data input to the anomaly detecting device 500, based on a state feature amount $d(i,n)$ input from the distributed-data analyzing unit 510. For example, the anomaly detecting unit 503 may calculate a score representing a probability that a normal model, which is indicated in accordance with m to which i and n of each input state feature amount $d(i,n)$ are related, takes the state feature amount $d(i,n)$, and then sense presence or absence of an anomaly, based on the score. Note that a method of calculating a score and a method of determining presence or absence of an anomaly, based on a score, may be similar to those in the third example embodiment.

Figure 13:
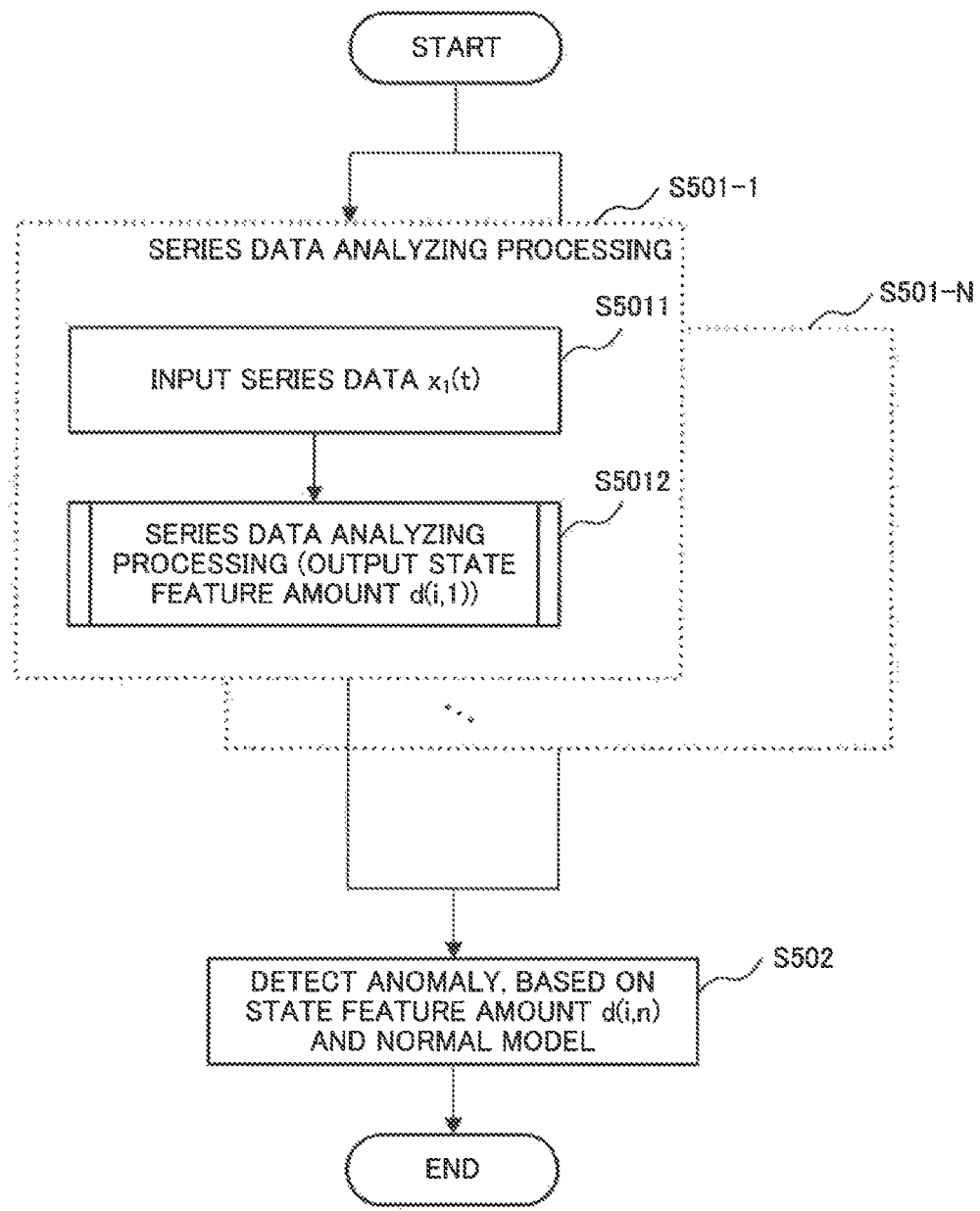
FIG. 13 is a flowchart illustrating one example of an operation of the anomaly detecting device according to the fifth example embodiment.

Next, an operation in the present example embodiment is described. FIG. 13 is a flowchart illustrating one example of an operation of the anomaly detecting device 500 according to the present example embodiment.

In the example illustrated in FIG. 13, N numbers of series data $x_1(t)$, . . . , and $x_N(t)$ are input to the anomaly detecting device 500. Each piece of series data $x_n(t)$ is input to the distributed-data analyzing unit 510-n related. Each of the distributed-data analyzing units 510-n performs series data analyzing processing for input series data $x_n(t)$ (step S501-1 to step S501-N). The series data analyzing processing is similar to that in the second example embodiment.

Finally, the anomaly detecting unit 503 detects anomalies of the N numbers of series data $x_1(t), \ldots,$ and $x_N(t)$, based on the state feature amounts $d(i,n)$ acquired from the N numbers of the distributed-data analyzing units 510-$n$, and a normal model (step S502).

As described above, based on the present example embodiment, it is possible to sense an anomaly, based on the state feature amounts based on a relationship among a plurality of generation mechanisms, in addition to a relationship of time such as a period of change in a state of one generation mechanism. Therefore, in addition to an advantageous effect in the third example embodiment, it is possible to sense an anomaly based on a relationship among generation mechanisms of input series data. In other words, based on the present example embodiment, it is possible to detect an anomalous outlier or change viewed from a relationship among a plurality of generation mechanisms.

Example Embodiment 6

Figure 14:
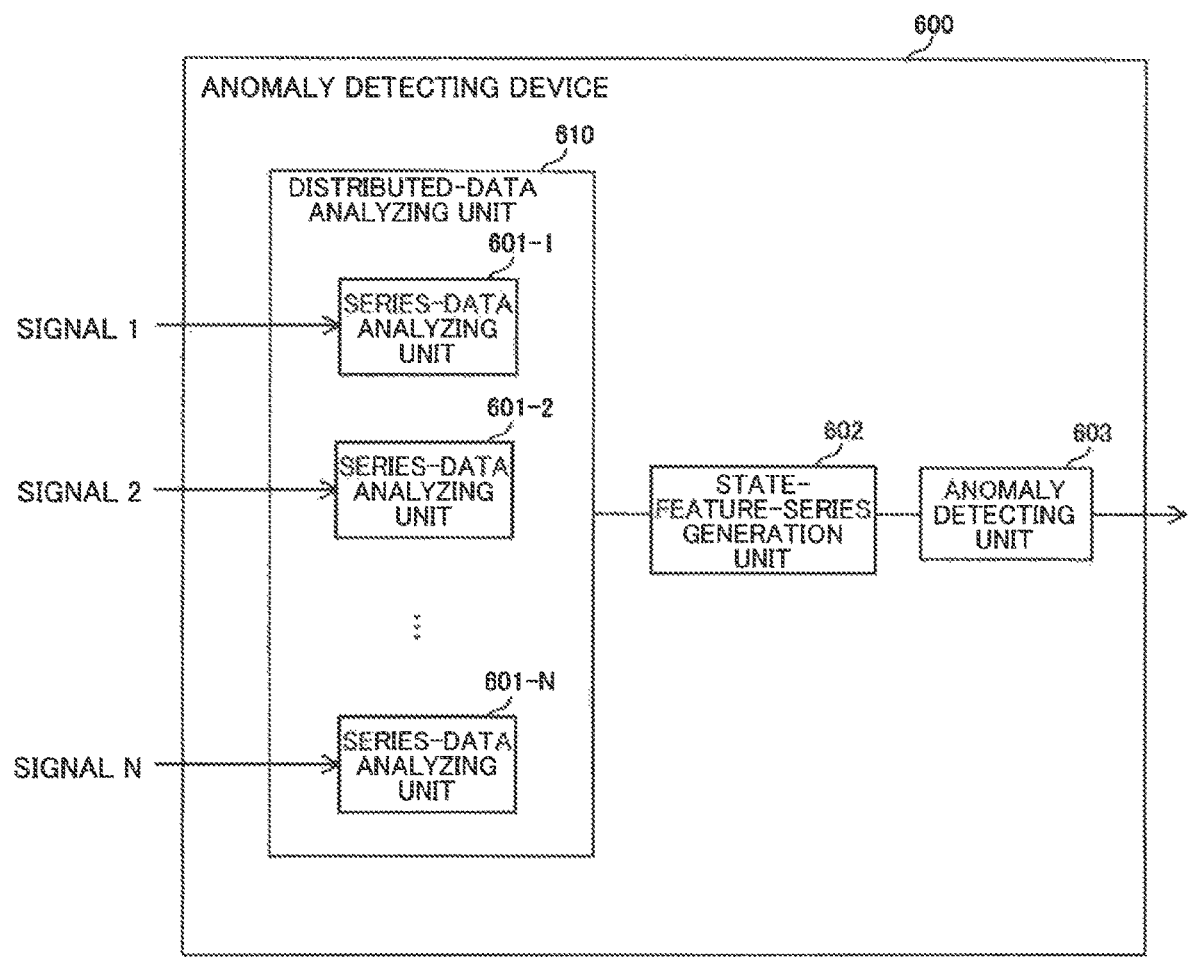
FIG. 14 is a block diagram illustrating a configuration example of an anomaly detecting device according to a sixth example embodiment.

Next, an anomaly detecting device 600 according to a sixth example embodiment of the present invention is described. FIG. 14 is a configuration diagram illustrating an example of the anomaly detecting device 600 according to the present example embodiment. The anomaly detecting device 600 illustrated in FIG. 14 includes a distributed-data analyzing unit 610, a state-feature-series generation unit 602, and an anomaly detecting unit 603.

The distributed-data analyzing unit 610 performs an operation similar to that of the distributed-data analyzing unit 510 according to the fifth example embodiment, acquires, as inputs, the series data $x_1(t), x_2(t), \ldots,$ and $x_N(t)$ (signals 1 to N in FIG. 14) generated from N numbers of generation mechanisms, and outputs the state feature amount $d(i,n)$.

The distributed-data analyzing unit 610 includes N numbers of series-data analyzing units 601 (series-data analyzing units 601-1 to 601-N).

The state-feature-series generation unit 602 acquires the state feature amount $d(i,n)$ as an input, and outputs a state feature amount series $d_2(j,n)$. Herein, the state feature amount series $d_2(j,n)$ is a vector having a same dimensional number as $d(i,n)$ acquired based on conversion of the state feature amount $d(i,n)$ or a scalar value. j is an index regarding a state feature amount series. Note that definition of j may be similar to that in the state-feature-series generation unit 402 according to the fourth example embodiment. In other words, the state feature amount series $d_2(j,n)$ can be said to be the state feature amount series $d_2(j)$ generated for each mechanism index n in the state-feature-series generation unit 402. In other words, the state-feature-series generation unit 602 is obtained by changing a form related to n in such a way that the operation of the state feature series generation unit 402 is performed N times.

The anomaly detecting unit 603 acquires the state feature amount series $d_2(j,n)$ as an input, and senses an anomalous state of a generation mechanism of series data $x_n(t)$. In the present example embodiment, since $d_2(j,n)$ includes an index j related to time and a mechanism index n, the anomaly detecting unit 603 can detect an anomaly viewed from not only a time relationship but also a relationship of a generation mechanism. Note that an anomaly detecting method in the anomaly detecting unit 603 may be similar to that in the anomaly detecting unit 403 according to the fourth example embodiment.

Note that the anomaly detecting unit 603 may define j in such a way that j is related to not only i but also n, similarly to m. In this case, a format of a state feature amount series output by the state-feature-series generation unit 602 is $d_2(j)$, but a value that j can take only changes, and there is no change in that the state feature amount series can represent both a time relationship and a relationship among generation mechanisms.

Figure 15:
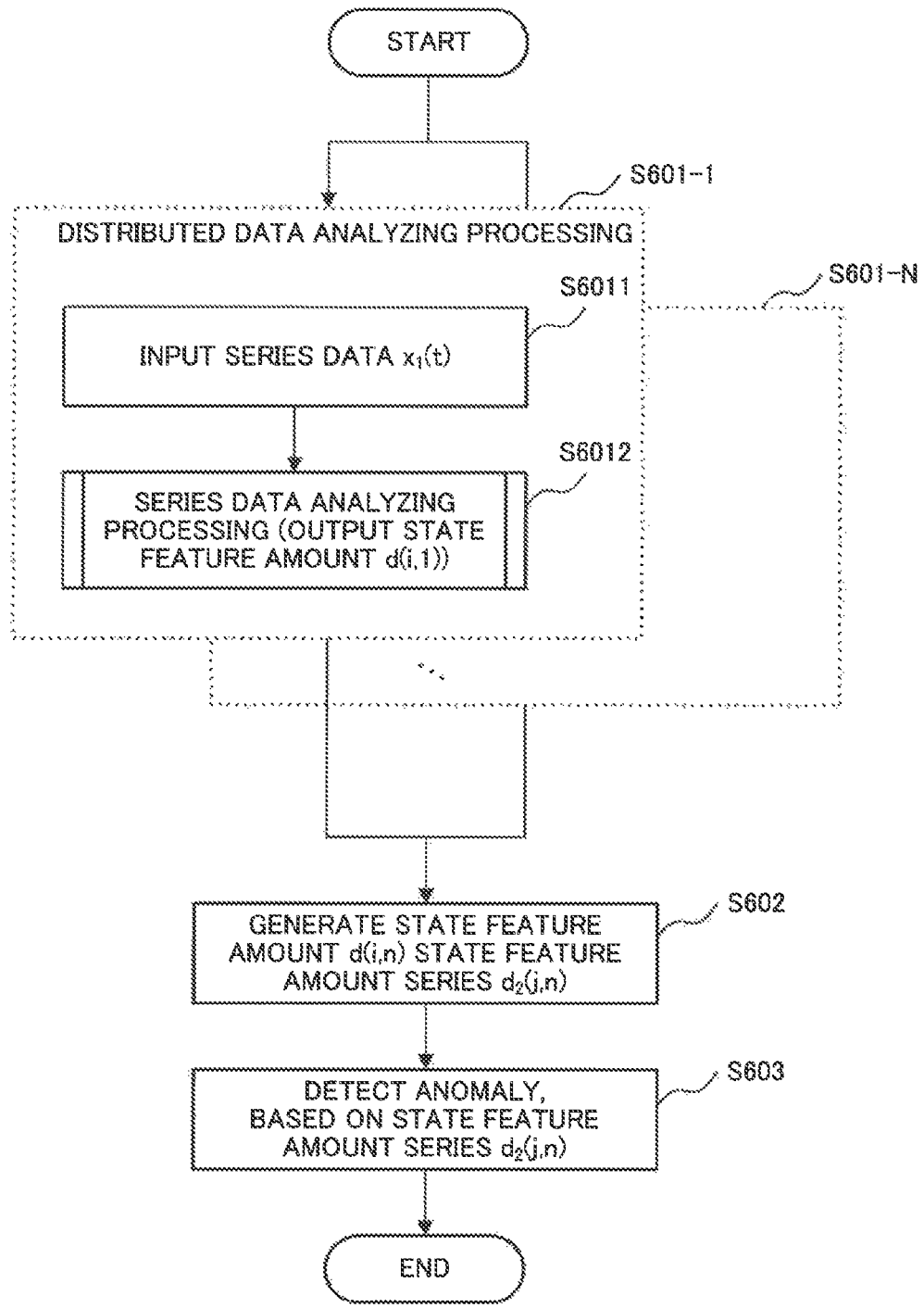
FIG. 15 is a flowchart illustrating one example of an operation of the anomaly detecting device according to the sixth example embodiment.

Next, an operation in the present example embodiment is described. FIG. 15 is a flowchart illustrating one example of an operation of the anomaly detecting device 600 according to the present example embodiment. Note that operations in a step S601-1 to a step S601-N are similar to those in the step S501-1 to the step S501-N according to the fifth example embodiment.

In the present example embodiment, when a state feature amount $d(i,n)$ is calculated in analyzing processing of each piece of series data, the state-feature-series generation unit 602 generates the state feature amount series $d_2(j,n)$ from the state feature amount $d(i,n)$ (step S602).

Finally, the anomaly detecting unit 603 detects anomalies of the N numbers of series data $x_1(t), \ldots,$ and $x_N(t)$, based on the state feature amount series $d_2(j,n)$ (step S603).

As described above, the present example embodiment designates, as new series data (state feature amount series), a collection of state feature amounts based on a relationship among a plurality of generation mechanisms, in addition to a relationship of time such as a period of a change in a state of one generation mechanism, and detects an anomaly, based on the series data. Therefore, in addition to an advantageous effect in the fourth example embodiment, it is possible to detect an anomaly based on a relationship among generation mechanisms of input series data. In other words, based on the present example embodiment, it is possible to detect an anomaly viewed from a relationship among a plurality of generation mechanisms.

Note that, although a time-series acoustic signal is presented as an example of series data in the example embodiments described above, series data are not limited to a time-series acoustic signal. For example, series data may be any series data such as a time-series temperature signal acquired from a temperature sensor, a time-series vibration signal acquired from a vibration sensor, or a video signal acquired from a camera. Alternatively, series data may be time-series data of electric power usage amount, series data of electric power usage amount for each consumer, time-series data of traffic intensity in a network, time-series data of an air quantity, or spatial series data of precipitation amount in a certain range. Alternatively, series data may otherwise be angle series data, or discrete series data of text or the like. Naturally, series data include not only equally interval series data but also unequally interval series data.

Furthermore, the present invention may be applied to a system composed of a plurality of apparatuses, or may be applied to a single device. Moreover, the present invention is also applicable to a case where an information processing program which achieves a function according to an example embodiment is directly or remotely supplied to a system or a device. Therefore, in order to achieve a function according to the present invention in a computer, a program installed in a computer, or a medium storing the program, and a world wide web (WWW) server into which the program is downloaded also fall within the scope of the present invention. Particularly, at least a non-transitory computer readable medium storing a program for a computer to execute a processing step included in the example embodiments described above falls within the scope of the present invention.

[Hardware Configurations]

Hardware configurations of the above-described anomaly detecting devices 100 to 600 are described with reference to the anomaly detecting device 100.

The anomaly detecting device 100 is configured as follows. For example, each component of the anomaly detecting device 100 may be configured by a hardware circuit. Moreover, in the anomaly detecting device 100, each component may be configured by using a plurality of devices connected via a network. Further, in the anomaly detecting device 100, a plurality of components may be configured by one piece of hardware. Still further, the anomaly detecting device 100 may be achieved as a computer device including a central processing unit (CPU), a read only memory (ROM), and a random access memory (RAM). The anomaly detecting device 100 may be achieved as a computer device further including, in addition to the above-described configuration, an input and/or output circuit (IOC) and a network interface circuit (NIC).

Figure 16:
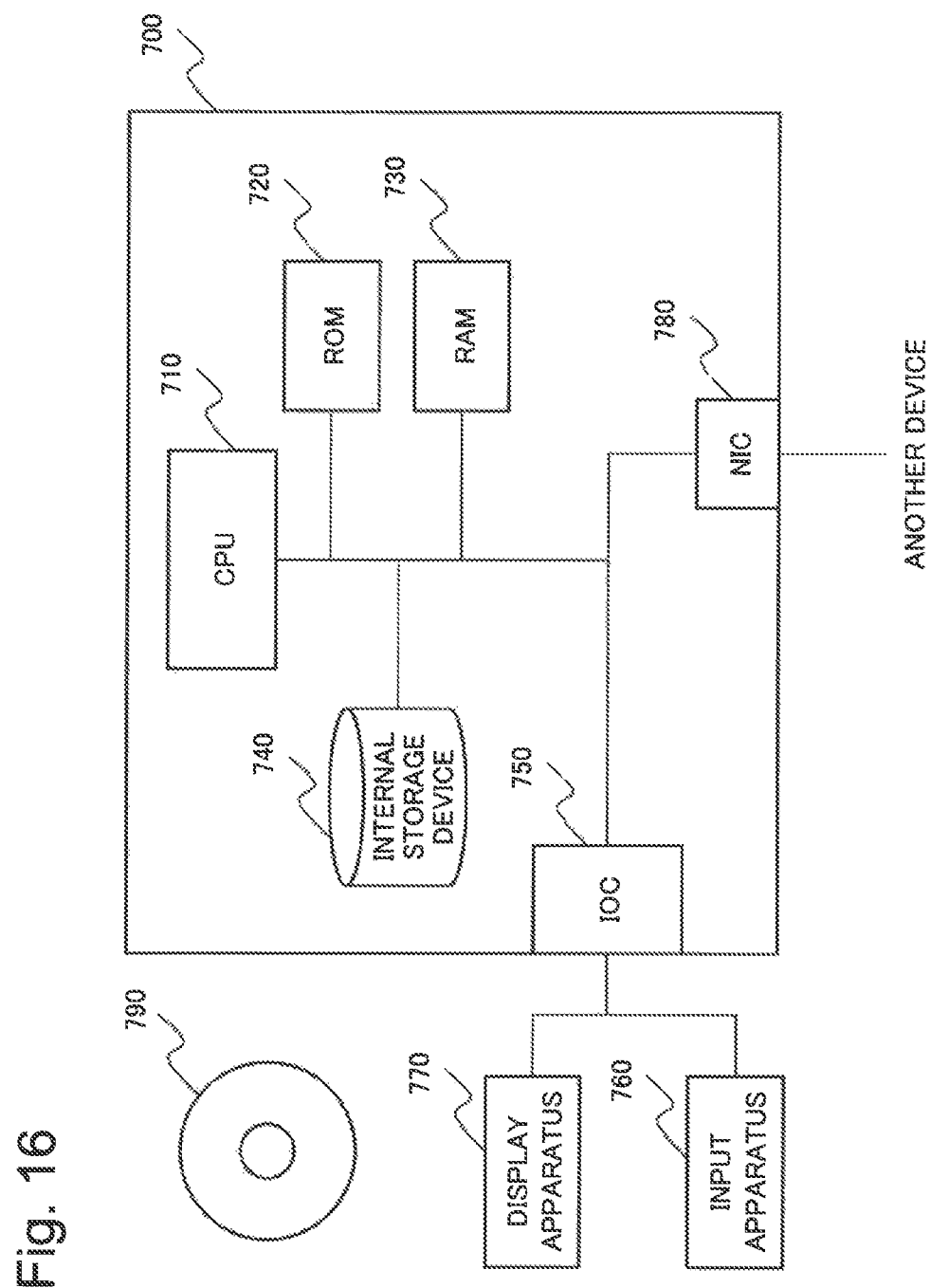
FIG. 16 is a block diagram illustrating one example of a hardware configuration.

FIG. 16 is a block diagram illustrating one example of a configuration of an information processing device 700 being one example of hardware of the anomaly detecting device 100.

The information processing device 700 includes a CPU 710, a ROM 720, a RAM 730, an internal storage device 740, an IOC 750, and a NIC 780, and configures a computer device.

The CPU 710 reads a program from the ROM 720. Then, based on the read program, the CPU 710 controls the RAM 730, the internal storage device 740, the IOC 750, and the NIC 780. Then, a computer including the CPU 710 controls these components, and achieves functions as the series-feature extracting unit 101, the series-probability-distribution calculating unit 102, the state-feature calculating unit 104, and the anomaly detecting unit 105.

When achieving each function, the CPU 710 may use the RAM 730 or the internal storage device 740 as a temporary storage medium of a program.

Furthermore, the CPU 710 may read a program included in a recording medium 790 which computer-readably stores the program, by using a non-illustrated storage medium reading device. Alternatively, the CPU 710 may receive a program from a non-illustrated external device via the NIC 780, saves the program in the RAM 730, and then operate, based on the saved program.

The ROM 720 stores a program executed by the CPU 710, and fixed data. The ROM 720 is, for example, a programmable-ROM (P-ROM) or a flash ROM.

The RAM 730 temporary stores a program executed by the CPU 710, and data. The RAM 730 is, for example, a dynamic-RAM (D-RAM).

The internal storage device 740 stores data and a program saved by the information processing device 700 for a long period. The internal storage device 740 operates as the reference-probability-distribution storage unit 103. Moreover, the internal storage device 740 may operate as a temporary storage device of the CPU 710. The internal storage device 740 is, for example, a hard disk device, a magneto-optical disk, a solid state drive (SSD), or a disk array device.

Herein, the ROM 720 and the internal storage device 740 are non-transitory storage media. On the other hand, the RAM 730 is a transitory storage medium. Then, the CPU 710 is operable, based on a program stored in the ROM 720, the internal storage device 740, or the RAM 730. In other words, the CPU 710 is operable by using a non-transitory storage medium or a transitory storage medium.

The IOC 750 mediates data between the CPU 710 and an input apparatus 760 as well as a display apparatus 770. The IOC 750 is, for example, an IO interface card or a universal serial bus (USB) card. Moreover, the IOC 750 is not limited to a wire such as a USB, and may use wireless.

The input apparatus 760 is an apparatus which receives an input instruction from an operator of the information processing device 700. The input apparatus 760 is, for example, a keyboard, a mouse, or a touch panel.

The display apparatus 770 is an apparatus which displays information to an operator of the information processing device 700. The display apparatus 770 is, for example, a liquid crystal display.

The NIC 780 relays exchange of data with a non-illustrated external device via a network. The NIC 780 is, for example, a local area network (LAN) card. Moreover, the NIC 780 is not limited to a wire, and may use wireless.

The information processing device 700 configured in this way can acquire an advantageous effect similar to that of the anomaly detecting device 100.

A reason for this is that the CPU 710 of the information processing device 700 can achieve a function similar to that of the anomaly detecting device 100, based on a program.

The whole or part of the example embodiments disclosed above can be described as the following supplementary notes.

(Supplementary Note 1)

An anomaly detecting device includes:

a memory; and at least one processor coupled to the memory, the processor performing operations, the operations including:

when first series data are input, extracting a series feature amount being a feature amount of a signal included in the first series data;

calculating a series probability distribution being a probability distribution which the series feature amount follows;

storing a reference probability distribution being a probability distribution designated as a reference for the series feature amount in the first series data;

calculating a state feature amount representing a fluctuation condition of the series probability distribution with respect to the reference probability distribution; and detecting an anomaly of the first series data, based on a plurality of the state feature amounts calculated from the first series data.

(Supplementary Note 2)

The anomaly detecting device according to supplementary note 1, wherein the operations further includes extracting, as the series feature amount, a predetermined feature amount of a signal at a time point of each time frame defined with a predetermined time unit, calculating a probability distribution in which the series feature amount for each of the time frames is designated as a stochastic variable, calculating, for each of the time frames, the state feature amount representing, by a predetermined method, a distance between the series probability distribution at a time point of the time frame and the reference probability distribution related to the time point of the time frame, and detecting the anomaly, based on the state feature amount for each of the time frames calculated from the first series data.

(Supplementary Note 3)

The anomaly detecting device according to supplementary note 2, wherein the operations further includes designating, as second series data, data in which the state feature amount for each of the time frames calculated from the first series data is arranged in a time-series form, statistically processing the second series data, and then detecting the anomaly.

(Supplementary Note 4)

The anomaly detecting device according to any one of supplementary notes 1 to 3, wherein the operations further includes:

storing a normal model being a probability distribution of the state feature amount at a normal time in the first series data, and being a probability distribution of the state feature amount specified based on a model index signifying a time within at least a particular period, and detecting the anomaly, based on the calculated state feature amount and the normal model.

(Supplementary Note 5)

The anomaly detecting device according to supplementary note 4, wherein the operations further includes detecting the anomaly, based on a score calculated based on a probability that the state feature amount occurs, the state feature amount indicated by the normal model related to a time point when the calculated state feature amount is acquired.

(Supplementary Note 6)

The anomaly detecting device according to supplementary note 2, wherein the operations further includes:

reconstructing the state feature amount for each of the time frames defined with a predetermined time unit, according to a predetermined period, then generating one or more state feature amount series, designating each of the state feature amount series as second series data, statistically processing the second series data, and then detecting the anomaly.

(Supplementary Note 7)

The anomaly detecting device according to any one of supplementary notes 1 to 6, wherein a plurality of pieces of the first series data each representing a state of a different place in a target environment are input, wherein the operations further includes detecting, for each piece of the first series data, the anomaly, based on a plurality of the state feature amounts calculated from the piece of the first series data.

(Supplementary Note 8)

The anomaly detecting device according to supplementary note 7, wherein the operations further includes storing a probability distribution designated as a reference for the series feature amount in the predetermined first series data.

(Supplementary Note 9)

The anomaly detecting device according to supplementary note 1 or 2, wherein a plurality of pieces of the first series data each representing a state of a different place in a target environment are input, wherein the operations further includes detecting, for each piece of the first series data, the anomaly, based on a plurality of the state feature amounts calculated from the piece of the first series data.

(Supplementary Note 10)

The anomaly detecting device according to supplementary note 9, wherein the operations further includes:

storing a normal model being a probability distribution of the state feature amount at a normal time in each piece of the first series data, and being a probability distribution of the state feature amount specified based on a model index signifying a time within at least a particular period, and detecting, for each piece of the first series data, the anomaly, based on the state feature amount calculated from the piece of the first series data, and the normal model related to the piece of the first series data.

(Supplementary Note 11)

The anomaly detecting device according to supplementary note 9, wherein the operations further includes:

reconstructing, for each piece of the first series data, the state feature amount calculated from the piece of the first series data according to a predetermined period, then generating a series of one or more of the state feature amounts, for each piece of the first series data, designating, as second series data, each of the series of the state feature amounts generated from a plurality of the state feature amounts calculated from the piece of the first series data, statistically processing the second series data, and then detecting the anomaly.

(Supplementary Note 12)

The anomaly detecting device according to any one of supplementary notes 1, 2, and 9 to 11, wherein the operations further includes:

generating the reference probability distribution by using the first series data at a normal time.

(Supplementary Note 13)

The anomaly detecting device according to any one of supplementary notes 1, 2, and 9 to 12, wherein the operations further includes:

generating a normal model by using a plurality of the state feature amounts calculated from the first series data at a normal time.

(Supplementary Note 14)

The anomaly detecting device according to any one of supplementary notes 1, 2, and 9 to 13, wherein the first series data are time-series acoustic signals.

(Supplementary Note 15)

The anomaly detecting device according to any one of supplementary notes 1, 2, and 9 to 14, wherein the series feature amount is a feature amount expressing a frequency and/or power of sound included in time-series acoustic signals, expression forms of the series probability distribution and the reference probability distribution are a Gaussian mixture distribution, and the state feature amount is a Kullback-Leibler (KL) divergence, a vector in which a predetermined number of the KL divergences are arranged, a vector in which a predetermined number of square distances of mean vectors of the Gaussian distributions in a predetermined rank are arranged, or a norm of each of the vectors.

(Supplementary Note 16)

An anomaly detecting method includes:

when first series data are input, extracting a series feature amount being a feature amount of a signal included in the first series data;

calculating a series probability distribution being a probability distribution which the series feature amount follows;

calculating a state feature amount representing a fluctuation condition of the series probability distribution with respect to a reference probability distribution being a probability distribution designated as a reference for the series feature amount in the first series data; and detecting an anomaly of the first series data, based on a plurality of the state feature amounts calculated from the first series data.

(Supplementary Note 17)

The anomaly detecting method according to supplementary note 16, further includes:

extracting, as the series feature amount, a predetermined feature amount of a signal at a time point of each time frame defined with a predetermined time unit;

calculating a probability distribution in which the series feature amount for each of the time frames is designated as a stochastic variable;

calculating, for each of the time frames, the state feature amount representing, by a predetermined method, a distance between the series probability distribution at a time point of the time frame and the reference probability distribution related to a time point of the time frame; and detecting the anomaly, based on the state feature amount for each of the time frames calculated from the first series data.

(Supplementary Note 18)

A non-transitory computer-readable recording medium embodying an anomaly detecting program, the anomaly detecting program causing a computer to perform a method, the method including:

when first series data are input, extracting a series feature amount being a feature amount of a signal included in the first series data;

calculating a series probability distribution being a probability distribution which the series feature amount follows;

calculating a state feature amount representing a fluctuation condition of the series probability distribution with respect to a reference probability distribution being a probability distribution designated as a reference for the series feature amount in the first series data; and detecting an anomaly of the first series data, based on a plurality of the state feature amounts calculated from the first series data.

(Supplementary Note 19)

The recording medium according to supplementary note 18, embodying the anomaly detecting program for further causing a computer to perform the method, the method further including:

extracting, as the series feature amount, a predetermined feature amount of a signal at a time point of each time frame defined with a predetermined time unit;

calculating, a probability distribution in which the series feature amount for each of the time frames is designated as a stochastic variable;

calculating, for each of the time frames, the state feature amount representing, by a predetermined method, a distance between the series probability distribution at a time point of the time frame and the reference probability distribution related to the time point; and detecting the anomaly, based on the state feature amount for each of the time frames calculated from the first series data.

While the invention has been particularly shown and described with reference to example embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2016 175402, filed on Sep. 8, 2016, the disclosure of which is incorporated herein in its entirety by reference.

INDUSTRIAL APPLICABILITY

The present invention is suitably applicable to not only anomaly detection targeted for such an environment as to change in state even at a normal time, but also anomaly detection for any series data.

REFERENCE SIGNS LIST

100, 200, 300, 400, 500, 600 Anomaly detecting device
101, 201, 221, 511 Series-feature extracting unit
102 Series-probability-distribution calculating unit
202, 512 Probability-distribution calculating unit
222 Reference-probability distribution calculating unit
103, 203, 513 Reference-probability-distribution storage unit
104, 204, 514 State-feature calculating unit
105, 205, 303, 403, 503, 603 Anomaly detecting unit
210, 301, 311, 401, 501, 601 Series-data analyzing unit
302, 502 Normal-model storage unit
312 Normal-model calculating unit
402, 602 State-feature-series generation unit
510, 610 Distributed-data analyzing unit
700 Information processing device
710 CPU
720 ROM
730 RAM
740 Internal storage device
750 IOC
760 Input apparatus
770 Display apparatus
780 NIC
790 Recording medium

What is claimed is:

1. An anomaly detecting device comprising:
a memory; and
at least one processor coupled to the memory,
the processor performing operations, the operations comprising:
when first series data are input, extracting a series feature amount being a feature amount of a signal included in the first series data;
calculating a series probability distribution being a probability distribution which the series feature amount follows;
storing a reference probability distribution being a probability distribution designated as a reference for the series feature amount in the first series data;
calculating a state feature amount representing a fluctuation condition of the series probability distribution with respect to the reference probability distribution; and
detecting an anomaly of the first series data, based on a plurality of the state feature amounts calculated from the first series data,
wherein the operations further comprise:
extracting, as the series feature amount, a predetermined feature amount of a signal at a time point of each time frame defined with a predetermined time unit, calculating a probability distribution in which the series feature amount for each of the time frames is designated as a stochastic variable, calculating, for each of the time frames, the state feature amount representing, by a predetermined method, a distance between the series probability distribution at a time point of the time frame and the reference probability distribution related to the time point of the time frame, and detecting the anomaly, based on the state feature amount for each of the time frames calculated from the first series data.

2. The anomaly detecting device according to claim 1, wherein the operations further comprises designating, as second series data, data in which the state feature amount for each of the time frames calculated from the first series data is arranged in a time-series form, statistically processing the second series data, and then detecting the anomaly.

3. The anomaly detecting device according to claim 1, wherein the operations further comprises:

storing a normal model being a probability distribution of the state feature amount at a normal time in the first series data, and being a probability distribution of the state feature amount specified based on a model index signifying a time within at least a particular period, and detecting the anomaly, based on the calculated state feature amount and the normal model.

4. The anomaly detecting device according to claim 3, wherein the operations further comprises detecting the anomaly, based on a score calculated based on a probability that the state feature amount occurs, the state feature amount indicated by the normal model related to a time point when the calculated state feature amount is acquired.

5. The anomaly detecting device according to claim 1, wherein the operations further comprises:

reconstructing the state feature amount for each of the time frames defined with a predetermined time unit, according to a predetermined period, aad then generating one or more state feature amount series, designating each of the state feature amount series as second series data, statistically processing the second series data, and then detecting the anomaly.

6. The anomaly detecting device according to claim 1, wherein a plurality of pieces of the first series data each representing a state of a different place in a target environment are input, wherein the operations further comprises detecting, for each piece of the first series data, the anomaly, based on a plurality of the state feature amounts calculated from the piece of the first series data.

7. The anomaly detecting device according to claim 6, wherein the operations further comprises storing a probability distribution designated as a reference for the series feature amount in the predetermined first series data.

8. The anomaly detecting device according to claim 1, wherein a plurality of pieces of the first series data each representing a state of a different place in a target environment are input, wherein the operations further comprises detecting, for each piece of the first series data, the anomaly, based on a plurality of the state feature amounts calculated from the piece of the first series data.

9. The anomaly detecting device according to claim 8, wherein the operations further comprises:

storing a normal model being a probability distribution of the state feature amount at a normal time in each piece of the first series data, and being a probability distribution of the state feature amount specified based on a model index signifying a time within at least a particular period, and detecting, for each piece of the first series data, the anomaly, based on the state feature amount calculated from the piece of the first series data, and the normal model related to the piece of the first series data.

10. The anomaly detecting device according to claim 8, wherein the operations further comprises:

reconstructing, for each piece of the first series data, the state feature amount calculated from the piece of the first series data according to a predetermined period, and then generating a series of one or more of the state feature amounts, for each piece of the first series data, designating, as second series data, each of the series of the state feature amounts generated from a plurality of the state feature amounts calculated from the piece of the first series data, statistically processing the second series data, and then detecting the anomaly.

11. The anomaly detecting device according to claim 1, wherein the operations further comprises:

generating the reference probability distribution by using the first series data at a normal time.

12. The anomaly detecting device according to claim 1, wherein the operations further comprises:

generating a normal model by using a plurality of the state feature amounts calculated from the first series data at a normal time.

13. The anomaly detecting device according to claim 1, wherein the first series data are time-series acoustic signals.

14. The anomaly detecting device according to claim 1, wherein the series feature amount is a feature amount expressing a frequency and/or power of sound included in time-series acoustic signals, expression forms of the series probability distribution and the reference probability distribution are a Gaussian mixture distribution, and the state feature amount is a Kullback-Leibler (KL) divergence, a vector in which a predetermined number of the KL divergences are arranged, a vector in which a predetermined number of square distances of mean vectors of the Gaussian distributions in a predetermined rank are arranged, or a norm of each of the vectors.

15. An anomaly detecting method comprising:

when first series data are input, extracting a series feature amount being a feature amount of a signal included in the first series data;

calculating a series probability distribution being a probability distribution which the series feature amount follows;

calculating a state feature amount representing a fluctuation condition of the series probability distribution with respect to a reference probability distribution being a probability distribution designated as a reference for the series feature amount in the first series data; and detecting an anomaly of the first series data, based on a plurality of the state feature amounts calculated from the first series data, the method further comprising:

extracting, as the series feature amount, a predetermined feature amount of a signal at a time point of each time frame defined with a predetermined time unit;

calculating a probability distribution in which the series feature amount for each of the time frames is designated as a stochastic variable;

calculating, for each of the time frames, the state feature amount representing, by a predetermined method, a distance between the series probability distribution at a time point of the time frame and the reference probability distribution related to a time point of the time frame; and detecting the anomaly, based on the state feature amount for each of the time frames calculated from the first series data.

16. A non-transitory computer-readable recording medium embodying an anomaly detecting program, the anomaly detecting program causing a computer to perform a method, the method comprising:

when first series data are input, extracting a series feature amount being a feature amount of a signal included in the first series data;

calculating a series probability distribution being a probability distribution which the series feature amount follows;

calculating a state feature amount representing a fluctuation condition of the series probability distribution with respect to a reference probability distribution being a probability distribution designated as a reference for the series feature amount in the first series data; and detecting an anomaly of the first series data, based on a plurality of the state feature amounts calculated from the first series data, the method further comprising:

extracting, as the series feature amount, a predetermined feature amount of a signal at a time point of each time frame defined with a predetermined time unit;

calculating a probability distribution in which the series feature amount for each of the time frames is designated as a stochastic variable;

calculating, for each of the time frames, the state feature amount representing, by a predetermined method, a distance between the series probability distribution at a time point of the time frame and the reference probability distribution related to the time point;

and detecting the anomaly, based on the state feature amount for each of the time frames calculated from the first series data.

* * * * *